United States Patent
Emura et al.

(10) Patent No.: US 6,733,942 B2
(45) Date of Patent: May 11, 2004

(54) TONER COMPOSITION AND METHOD FOR PRODUCTION THEREOF

(75) Inventors: Yuji Emura, Chiba (JP); Shoji Kawasaki, Chiba (JP); Masaaki Shin, Chiba (JP); Hiroshi Matsuoka, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/129,525

(22) PCT Filed: Sep. 7, 2001

(86) PCT No.: PCT/JP01/07781

§ 371 (c)(1), (2), (4) Date: May 7, 2002

(87) PCT Pub. No.: WO02/21219

PCT Pub. Date: Mar. 14, 2002

(65) Prior Publication Data

US 2003/0008225 A1 Jan. 9, 2003

(30) Foreign Application Priority Data

Sep. 7, 2000 (JP) .................. 2000-272000
Sep. 7, 2000 (JP) .................. 2000-272001

(51) Int. Cl.$^7$ .................. G03G 9/087
(52) U.S. Cl. .................. 430/109.4; 430/137.1
(58) Field of Search .................. 430/109.4, 137.1

(56) References Cited

U.S. PATENT DOCUMENTS

| | | | |
|---|---|---|---|
| 4,833,057 A | 5/1989 | Misawa et al. |
| 4,981,923 A | 1/1991 | Hagiwara et al. |
| 5,037,715 A | 8/1991 | Hagiwara et al. |
| 5,202,212 A | 4/1993 | Shin et al. |
| 5,368,968 A | 11/1994 | Wehrmann et al. |
| 5,618,648 A | 4/1997 | Horikoshi et al. |
| 5,908,726 A | 6/1999 | Inoue et al. |
| 6,284,423 B1 | 9/2001 | Maekawa et al. |
| 6,395,843 B2 | 5/2002 | Maekawa et al. |

FOREIGN PATENT DOCUMENTS

| | | |
|---|---|---|
| EP | 0 438 269 A | 7/1991 |
| EP | 1 011 031 A | 6/2000 |
| EP | 1 026 554 A | 8/2000 |
| EP | 1 102 127 A | 5/2001 |
| JP | 60-90344 A | 5/1985 |
| JP | 4-296324 A | 10/1992 |
| JP | 3-196051 A | 9/1993 |
| JP | 7-101319 B2 | 11/1995 |
| JP | 8-5947 B2 | 1/1996 |
| JP | 8-253596 A | 10/1996 |

*Primary Examiner*—John Goodrow
(74) *Attorney, Agent, or Firm*—Burns, Doane, Swecker & Mathis, LLP

(57) ABSTRACT

The present invention relates to a toner composition for electrophotography, used for development of electrostatic image in electrophotography, electrostatic printing, etc., as well as to a process for producing such a toner composition.

The toner composition of the present invention comprises a binder resin component [component (A)] and a coloring agent component [component (B)], wherein the binder resin component [component (A)] comprises a particular crosslinked aromatic polyester resin component [component (a-1)] and a particular linear aromatic polyester resin component [component (a-2)] and the proportions of the component (a-1) and the component (a-2) are 5 to 80% by weight [the component (a-1)] and 20 to 95% by weight [the component (a-2)] based on the total weight of the two components.

The present invention can provide a toner composition for electrophotography, which is superior in grindability, wax dispersibility and mechanical durability, superior in blocking resistance and offset resistance, and superior in balance between fixing properties after development and development durability.

23 Claims, 1 Drawing Sheet

TONER COMPOSITION AND METHOD FOR PRODUCTION THEREOF

TECHNICAL FIELD

The present invention relates to a toner composition for electrophotography, used for development of electrostatic image in electrophotography, electrostatic printing, etc.

BACKGROUND ART

With the progress of office automation, the demand for electrophotography-based copying machines and laser printers has increased rapidly and the performance requirements for such equipment have become higher.

In order to obtain a visible image using electrophotography, there is a generally used method which comprises electrifying a photo-sensitive material such as selenium, amorphous silicon, organic semiconductor or the like, then applying a light thereto, subjecting the resulting photo-sensitive material to development using a developing agent containing a toner, to form a toner image on the photo-sensitive material, transferring the toner image onto a transfer paper, and fixing the transferred toner image using a hot roll or the like.

At this time, it is natural that the image after development needs to be a clear image free from fogging and having a sufficient image density. Further, in recent years, higher speed, energy saving and high development durability have come to be required. Further more, in particular, from the standpoints of higher safety, maintenance-free operation has come to be required strongly; and a toner superior in low-temperature fixing properties is needed. In order to improve the fixing properties of toner, it is generally necessary to lower the viscosity of toner when melted, to enlarge the adhesion area between toner and substrate for toner; therefore, it has heretofore been conducted to lower the glass transition temperature (Tg) of the binder resin used or make smaller its molecular weight.

A resin of low glass transition temperature, however, is generally inferior in blocking resistance and, therefore, hardly stays as a stable powder during the use or storage of toner. Also, when a resin of small molecular weight and high fluidity is used and when a toner image is fixed using a hot roll, direct contact occurs between the hot roll and the molten toner during the fixing.

At this time, there has been a problem that the toner transferred on the hot roll tends to stain the transfer paper, etc. fed thereon after the toner (this is called an offset phenomenon).

In order to solve the above problem, it is being conducted generally to use a widened molecular weight distribution, whereby the high fluidity of resin when melted and the high viscosity of resin at high temperatures are satisfied simultaneously and low-temperature fixing properties and high-temperature offset resistance are achieved simultaneously.

When the proportion of low-molecular resin is increased or the molecular weight of low-molecular polymer is reduced, high fluidity is secured and improved low-temperature fixing properties is obtained; however, there have been problems of deterioration in offset resistance, reduction in resin strength owing to molecular weight reduction, deterioration of toner in long-period operation, and deterioration of image quality.

Meanwhile, when the proportion of low-molecular weight resin is decreased, or when molecular weight of resin is increased, improved offset resistance is obtained; however, fluidity is impaired and accordingly low-temperature fixing properties is deteriorated.

Thus, according to conventional techniques, it has been impossible to achieve excellent low-temperature fixing properties and excellent offset resistance (these two properties are antinomic) simultaneously.

In general, the polyester resin used as a binder resin of toner needs to have a wide molecular weight distribution in order to achieve satisfactory fixing properties and satisfactory offset resistance; therefore, tri-functional monomers are used.

When, in subjecting a polyhydric alcohol and a polycarboxylic acid to dehydration and polycondensation to produce a polyester, trifunctional monomers are fed into a polymerization reactor to allow a dehydration and polycondensation reaction and a crosslinking reaction to proceed simultaneously, excessive proceeding of crosslinking reaction generally incurs the winding of resin round the agitating rod used, owing to the Weissenberg effect and makes the agitation impossible. Therefore, it has been necessary to complete a polycondensation reaction before such trouble occurs and allow a crosslinking reaction to proceed in a separate reactor such as twin screw extruder or the like.

The present inventors already disclosed, in JP-B-7-101319, a technique of increasing the molecular weight of a polyester resin and widening its molecular weight distribution by means of a particular urethane crosslinkage. In this technique, a polyester resin to be crosslinked and a linear low-molecular polyester resin are produced separately, the two resins are combined, the resulting mixture and a polyisocyanate are kneaded using a twin-screw extruder or the like to give rise to a crosslinking reaction. This technique is very meaningful in that it could respond to the needs of the time. Since then, copiers and printers have come to employ a higher speed, and digital and color technologies have made significant progresses; therefore, even with the above technique, increasing the proportion of low-molecular resin for higher fluidity in order to achieve satisfactory low-temperature fixing properties has resulted in inferior offset resistance in some cases, and increasing the proportion of high-molecular resin for higher viscosity in order to achieve satisfactory offset resistance has resulted in inferior fixing properties in some cases.

Also in JP-B-08-5947 is disclosed a technique regarding a toner containing a modified polyester resin. That is, a polyester, a particular hydroxycarboxylic acid, a particular diol, a particular dicarboxylic acid and a particular crosslinking agent are reacted in given proportions to produce the above-mentioned resin superior in physical and chemical properties, useful as a construction material, etc. More specifically, (A) a polyester or a polyester mixture (1 to 99% by weight) is reacted with (B) a C2 to C21 hydroxycarboxylic acid or its derivative (0 to 60%), a mixture of (C) a C2 to C25 diol (40 to 60 mole %) and (D) a C3 to C22 carboxylic acid (40 to 60 mole %) or its derivative (1 to 99%), and (E) a crosslinking agent (e.g. trimellitic acid anhydride) (0 to 10%), at 130 to 350° C. in the presence of an ester transfer catalyst to produce an intended resin. Here, the components (A) to (E) are preferably 100% in total, and the components (C) and (D) are preferably 100 mole % in total.

However, only with the technique disclosed in JP-B-08-5947, it was unable to achieve the following properties simultaneously:

(1) superior blocking resistance,
(2) superior offset resistance,
(3) superior grindability,
(4) superior mechanical durability,
(5) superior wax dispersibility, and
(6) superior balance between post-development fixing properties and development durability.

In recent years, for image formation in electrophotography, a digital method capable of taking out information from computers or facsimile equipment has drawn attention. In the light application using this digital method, a laser is used as a means for light application; therefore, a fine line image can be outputted as compared with the conventional analog method and, in order to obtain a finer image, a toner small in particle diameter (average particle diameter) is required.

When a toner has a small particle diameter and when the resin used therein has a small strength, i.e. a small mechanical strength, however, there have been problems that an undesirable fine powder is formed in a large amount in the production process of the toner, resulting in a significant decrease in production yield and an increase in cost.

Also when a toner has a small diameter, a fine powder is formed easily in a copier during its stirring with a carrier, the carrier is stained thereby, and, in some cases, the amount of triboelectric charge becomes unstable and fogging appears; these matters have made it difficult to meet the requirements for maintenance-free operation.

Maintenance-free operation is required in the operation of a copier (the operation includes toner handling); therefore, a toner is strongly desired which hardly stains a carrier and can give a stable development image over a long period, that is, has development durability.

It is widely known to aim at both fixing properties and offset resistance only with a binder resin and also to use an additive (wax) capable of imparting releasability.

When a wax is used, there have been problems that the wax in toner composition drops off from the toner composition surface during the stirring of the composition with a carrier in a copier, which makes unstable the amount of triboelectric charge and gives rise to filming on a photosensitive material.

In order to prevent such problems, it is desired that the wax is finely and uniformly dispersed in the toner. However, since a low-molecular polypropylene or polyethylene is generally used as the wax, such a wax generally has low compatibility with a polyester, etc. and tends to have enlarged particle diameters when dispersed in the toner.

In recent years, an increase in population has increased the amount of energy used and has depleted resources. In connection therewith, resources saving, energy saving, recycling of resources, etc. have been claimed.

As to PET bottles, individual municipalities have started a recycling activity, and PET bottles have come to be utilized as clothes or containers. Thus, a desire for utilization of recycled PET is high.

OBJECT OF THE INVENTION

The object of the invention is to provide an excellent toner composition for electrophotography having all of the following properties which have been unable to obtain with conventional techniques:

(1) superior blocking resistance,
(2) superior offset resistance,
(3) superior grindability,
(4) superior mechanical durability,
(5) superior wax dispersibility, and
(6) superior balance between post-development fixing properties and development durability.

DISCLOSURE OF THE INVENTION

The present invention is specified by the matters described in the following [1] to [13].

[1] A toner composition comprising a binder resin component [component (A)] and a coloring agent component [component (B)], wherein the binder resin component [component (A)] comprises a crosslinked aromatic polyester resin component [Component (a-1)] and a linear aromatic polyester resin component [component (a-2)], the crosslinked aromatic polyester resin component [component (a-1)] is a crosslinked aromatic polyester resin having a recurring unit represented by the following chemical formula (1), the polyhydric alcohol-derived atomic group Q in the chemical formula (1) comprising 39.9 to 65 mole % of a polyhydric alcohol-derived atomic group represented by the following chemical formula (2), 0.1 to 20 mole % of a polyhydric alcohol-derived atomic group represented by the following chemical formula (3) and 15 to 60 mole % of a polyhydric alcohol-derived atomic group represented by the following chemical formula (4), each mole % being based on the total moles of all the polyhydric alcohol-derived atomic groups present in the molecule of the component (a-1), a crosslinking group represented by the following chemical formula (6) being present in the component (a-1) in an amount of 0.1 to 20 mole % based on the total moles of all the polyhydric alcohol-derived atomic groups present in the molecule of the component (a-1), and the recurring unit represented by the chemical formula (1) being crosslinked by the crosslinking group represented by the chemical formula (6), the linear aromatic polyester resin component [component (a-2)] is a linear aromatic polyester resin having a recurring unit represented by the chemical formula (1), the polyhydric alcohol-derived atomic group Q in the chemical formula (1) comprising 40 to 85 mole % of a polyhydric alcohol-derived atomic group represented by the chemical formula (2) and 15 to 60 mole % of a polyhydric alcohol-derived atomic group represented by the chemical formula (4), each mole % being based on the total moles of all the polyhydric alcohol-derived atomic groups present in the molecule of the component (a-2), and the proportions of the component (a-1) and the component (a-2) are 5 to 80% by weight [the component (a-1)] and 20 to 95% by weight [the component (a-2)] based on the total weight of the two components:

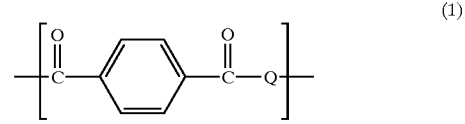

(1)

(2)

-continued

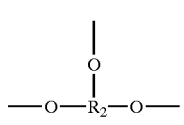
(3)

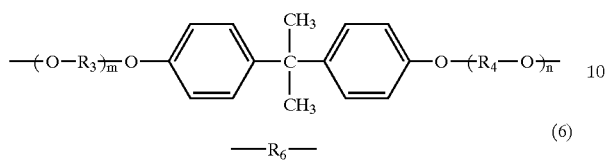
(4)
(6)

[wherein, in the chemical formula (1), Q is a polyhydric alcohol-derived atomic group; in the chemical formula (2), R1 is an atomic group having 2 to 10 carbon atoms, comprising an ethylene group, a propylene group, an isobutylene group and a butylene group; in the chemical formula (3), R2 is an atomic group having 3 to 10 carbon atoms, comprising a propylene group, an isobutylene group and a butylene group; in the chemical formula (4), R3 and R4 may be the same or different and are each independently an atomic group having 2 to 10 carbon atoms, comprising an ethylene group, a propylene group, an isobutylene group and a butylene group; in the chemical formula (4), m and n may be the same or different and are each independently an integer of 1 to 10; and in the chemical formula (6), R6 is an atomic group having 1 to 20 carbon atoms which may be aliphatic or aromatic and which may comprise N, O and S as atoms other than C and H].

[2] A toner composition comprising a binder resin component [component (A)] and a coloring agent component [component (B)], wherein the binder resin component [component (A)] comprises a crosslinked aromatic polyester resin component [Component (a-1)] and a linear aromatic polyester resin component [component (a-2)], the crosslinked aromatic polyester resin component [component (a-1)] is a crosslinked aromatic polyester resin having a recurring unit represented by the following chemical formula (1), the polyhydric alcohol-derived atomic group Q in the chemical formula (1) comprising 39.9 to 65 mole % of a polyhydric alcohol-derived atomic group represented by the following chemical formula (2), 0.1 to 20 mole % of a polyhydric alcohol-derived atomic group represented by the following chemical formula (3) and 15 to 60 mole % of a polyhydric alcohol-derived atomic group represented by the following chemical formula (4), each mole % being based on the total moles of all the polyhydric alcohol-derived atomic groups present in the molecule of the component (a-1), a crosslinking group represented by the following chemical formula (5) being present in the component (a-1) in an amount of 0.1 to 20 mole % based on the total moles of all the polyhydric alcohol-derived atomic groups present in the molecule of the component (a-1), and the recurring unit represented by the chemical formula (1) being crosslinked by the crosslinking group represented by the chemical formula (5), the linear aromatic polyester resin component [component (a-2)] is a linear aromatic polyester resin having a recurring unit represented by the chemical formula (1), the polyhydric alcohol-derived atomic group Q in the chemical formula (1) comprising 40 to 85 mole % of a polyhydric alcohol-derived atomic group represented by the chemical formula (2) and 15 to 60 mole % of a polyhydric alcohol-derived atomic group represented by the chemical formula (4), each mole % being based on the total moles of all the polyhydric alcohol-derived atomic groups present in the molecule of the component (a-2), and the proportions of the component (a-1) and the component (a-2) are 5 to 80% by weight [the component (a-1)] and 20 to 95% by weight [the component (a-2)] based on the total weight of the two components:

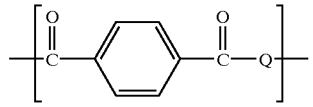
(1)

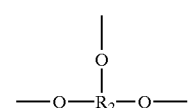
(2)

(3)

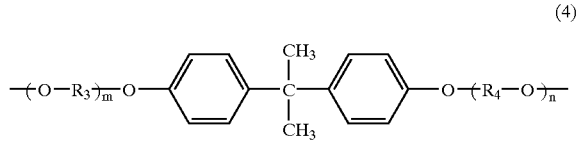
(4)

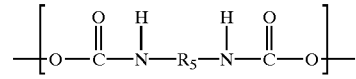
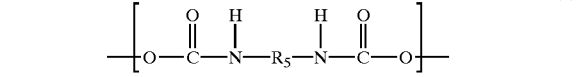
(5)

[wherein, in the chemical formula (1), Q is a polyhydric alcohol-derived atomic group; in the chemical formula (2), R1 is an atomic group having 2 to 10 carbon atoms, comprising an ethylene group, a propylene group, an isobutylene group and a butylene group; in the chemical formula (3), R2 is an atomic group having 3 to 10 carbon atoms, comprising a propylene group, an isobutylene group and a butylene group; in the chemical formula (4), R3 and R4 may be the same or different and are each independently an atomic group having 2 to 10 carbon atoms, comprising an ethylene group, a propylene group, an isobutylene group and a butylene group; in the chemical formula (4), m and n may be the same or different and are each independently an integer of 1 to 10; and in the chemical formula (5), R5 is an atomic group having 6 to 20 carbon atoms which may be aliphatic or aromatic, and comprises a phenylene group].

[3] A toner composition set forth in [1] or [2], wherein the binder resin component [component (A)] has such a viscoelasticity that, in the curve obtained by using the axis of abscissas as temperature and the axis of ordinates as logarithm of G' (storage modulus), a shoulder or peak having the maximum of the differential curve in a temperature range of 100 to 180° C. appears in a temperature range of 80 to 200° C.

[4] A toner composition set forth in [2] or [3], wherein the chemical formula (2) is the following chemical formula (2'), the chemical formula (3) is the following chemical formula (3'), the chemical formula (4) is the following chemical formula (4') and/or the following chemical formula (4"), and the chemical formula (5) is the following chemical formula (5'):

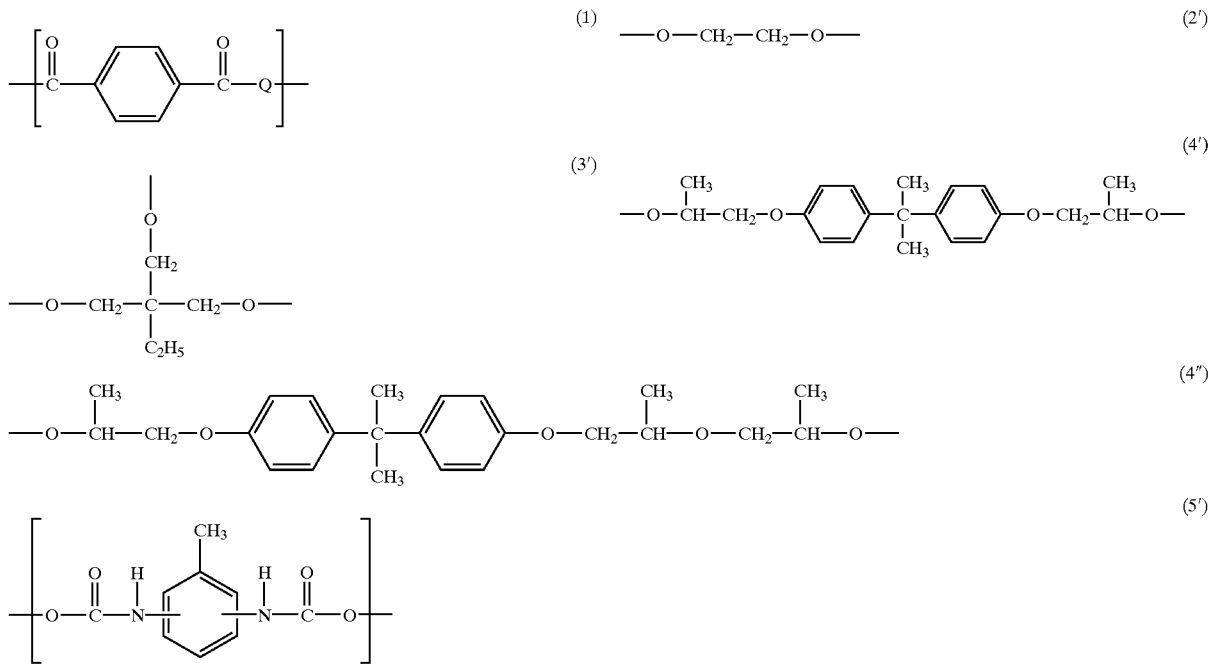

[5] A toner composition set forth in any of [1] to [4], wherein the tetrahydrofuran (THF) soluble portion of the binder resin component [component (A)] has a molecular weight distribution (Mw/Mn) of 6 to 100 when measured by gel permeation chromatography (GPC).

[6] A toner composition set forth in any of [1] to [5], wherein the tetrahydrofuran (THF) soluble portion of the binder resin component [component (A)] has a peak molecular weight of 1,000 to 8,000 when measured by gel permeation chromatography (GPC).

[7] A toner composition set forth in any of [1] to [6], wherein the tetrahydrofuran (THF) insoluble portion of the binder resin component [component (A)] is 0.1 to 40% by weight in the binder resin component [component (A)].

[8] A toner composition set forth in any of [1] to [7], wherein the binder resin component [component (A)] has a glass transition temperature (Tg) of 40 to 70° C.

[9] A toner composition set forth in any of [1] to [8], wherein the binder resin component [component (A)] has a density of 1.22 to 1.27 g/cm$^3$.

[10] A toner composition set forth in any of [1] to [9], wherein the binder resin component [component (A)] has an OH value of 0 to 100 KOH mg/g.

[11] A process for producing a toner composition, which comprises:

a first step of depolymerizing an aromatic polyester having a recurring unit represented by the following chemical formula (II) with a polyhydric alcohol comprising a dihydric alcohol represented by the following chemical formula (VI) and a trihydric alcohol represented by the following chemical formula (VII) and thereafter or simultaneously therewith adding a crosslinking agent represented by the following chemical formula (VIII) to give rise to a crosslinking reaction to produce a crosslinked aromatic polyester resin [component (a-1)] comprising a recurring unit represented by the chemical formula (II), a recurring unit represented by the following chemical formula (III), a recurring unit represented by the following chemical formula (IV) and a crosslinking group represented by the following chemical formula (V), in which component (a-1) the content of the recurring unit represented by the chemical formula (II) is 39.9 to 65 mole %, the content of the recurring unit represented by the chemical formula (III) is 0.1 to 20 mole %, the recurring unit represented by the chemical formula (IV) is 15 to 60 mole %, and the content of the crosslinking group represented by the chemical formula (V) is 0.1 to 20 mole %, all based on the total moles of the polyhydric alcohol-derived atomic groups present in the molecule of the component (a-1), and at least one recurring unit selected from the group consisting of the recurring units represented by the chemical formulas (II), (III) and (IV) is crosslinked by the crosslinking group represented by the chemical formula (V), a second step of depolymerizing an aromatic polyester comprising a recurring unit represented by the chemical formula (II) with a polyhydric alcohol comprising a dihydric alcohol represented by the chemical formula (VI) to produce a linear aromatic polyester resin [component (a-2)] comprising a recurring unit represented by the chemical formula (II) and a recurring unit represented by the following chemical formula (IV), in which component (a-2) the content of the recurring unit represented by the chemical formula (II) is 40 to 80 mole % and the content of the recurring unit represented by the chemical formula (IV) is 15 to 60 mole %, a third step of melt-kneading the component (a-1) produced in the first step and the component (a-2) produced in the second step, in proportions of 5 to 80% by weight [the component (a-1)] and 20 to 95% by weight [the component (a-2)] to produce a binder resin component [component (A)], and a fourth step of melt-kneading the binder resin component [component (A)] produced in the third step and a coloring agent component [component (B)] to produce a toner composition:

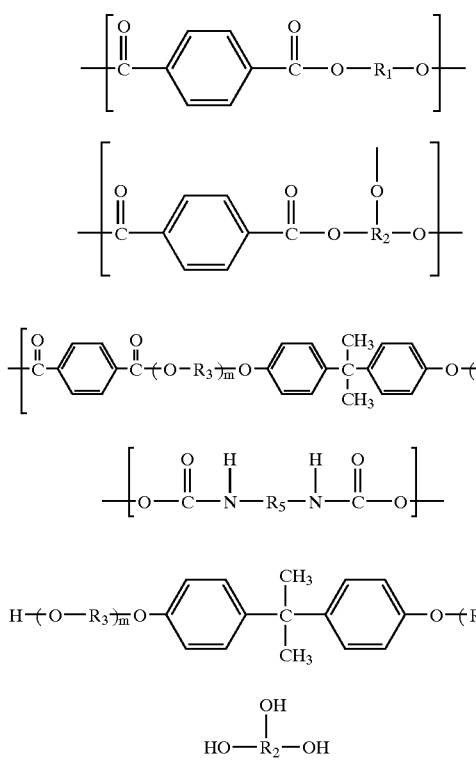

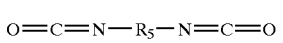

[wherein, in the chemical formula (II), R1 is an atomic group having 2 to 10 carbon atoms, comprising an ethylene group, a propylene group, an isobutylene group and a butylene group; in the chemical formula (III) and the chemical formula (VII), R2 is an atomic group having 3 to 10 carbon atoms, comprising a propylene group, an isobutylene group and a butylene group; in the chemical formula (IV) and the chemical formula (VI), R3 and R4 may be the same or different, are each independently an atomic group having 2 to 10 carbon atoms and comprise an ethylene group, a propylene group, an isobutylene group and a butylene group; in the chemical formula (IV) and the chemical formula (VI), m and n may be the same or different and are each independently an integer of 1 to 10; and in the chemical formula (V) and the chemical formula (VIII), R5 is an atomic group having 6 to 20 carbon atoms which may be aliphatic or aromatic, and comprises a phenylene group].

[12] A process for producing a toner composition, set forth in [11], wherein the chemical formula (II) is the following chemical formula (II'), the chemical formula (III) is the following chemical formula (III') and/or the following chemical formula (III"), the chemical formula (IV) is the following chemical formula (IV') and/or the following chemical formula (IV"), the chemical formula (V) is the following chemical formula (V'), the chemical formula (VI) is the following chemical formula (VI') and/or the following chemical formula (VI"), and the chemical formula (VII) is the following chemical formula (VII'):

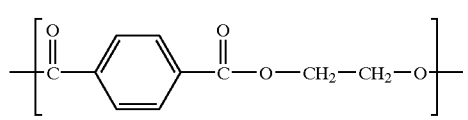

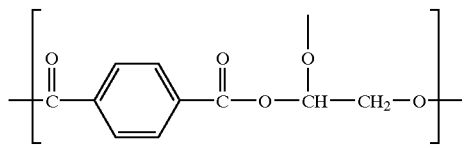

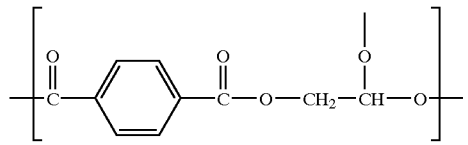

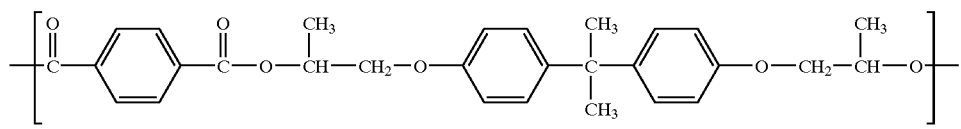

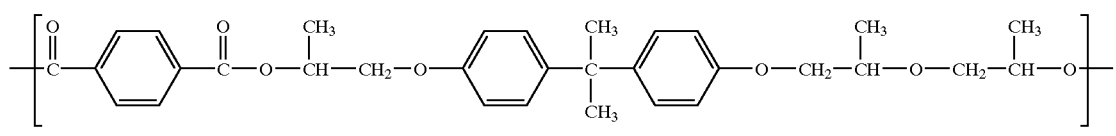

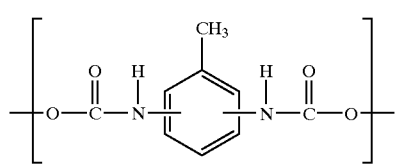

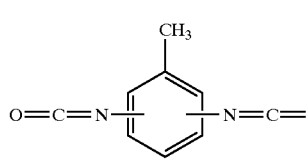

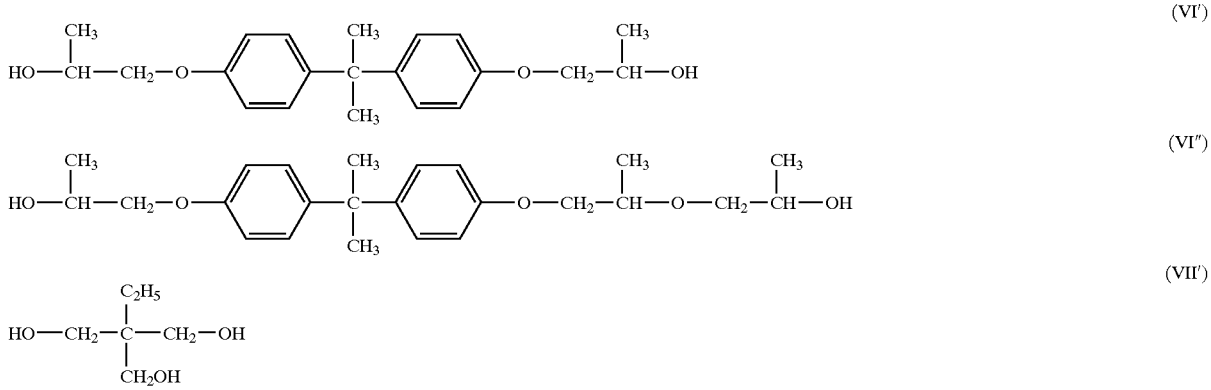

[13] A process for producing a toner composition, set forth in [11], wherein the aromatic polyester comprising a recurring unit represented by the chemical formula (II) is a recycled PET (polyethylene terephthalate) and/or a recycled PBT (polybutylene terephthalate).

BEST MODE FOR CARRYING OUT THE INVENTION

Figure 1:
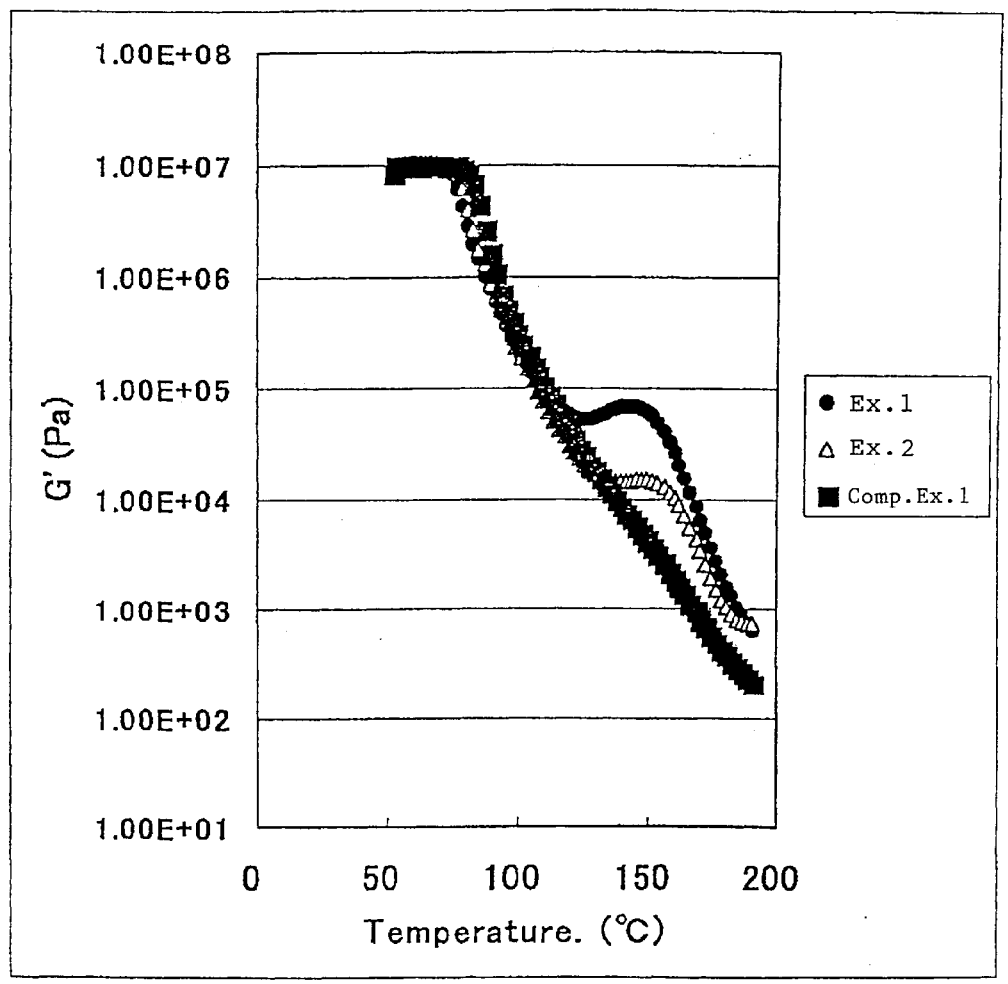
FIG. 1 is a graph showing relations between storage modulus and temperature, of the toner compositions of Examples 1 and 2 or the present invention and the toner composition of Comparative Example 1.

The present invention is described in more detail below.

In the crosslinked aromatic polyester resin component [(component (a-1)] comprised in the binder resin component [component (A)] used in the present invention, the polyhydric alcohol-derived atomic groups need to comprise 39.9 to 65 mole % of a polyhydric alcohol-derived atomic group represented by the chemical formula (2), 0.1 to 20 mole % of a polyhydric alcohol-derived atomic group represented by the chemical formula (3) and 15 to 60 mole % of a polyhydric alcohol-derived atomic group represented by the chemical formula (4), each mole % being based on the total moles of all the polyhydric alcohol-derived atomic groups present in the molecule of the component (a-1) and that a crosslinking group represented by the chemical formula (6) is present in an amount of 0.1 to 20 mole % based on the total moles of all the polyhydric alcohol-derived atomic groups present in the molecule of the component (a-1).

When the proportion of the polyhydric alcohol-derived atomic group represented by the chemical formula (2) is less than 39.9 mole %, a lower density and inferior mechanical durability result; therefore, such a proportion is not preferred. When the proportion is more than 65 mole %, a higher density and inferior grindability result; therefore, such a proportion is not preferred from the standpoint of productivity.

When the proportion of the polyhydric alcohol-derived atomic group represented by the chemical formula (3) is less than 0.1 mole %, the crosslinking by the crosslinking group represented by the chemical formula (6) takes place hardly, the proportion of the high-molecular polymer component obtained is small, and inferior offset resistance and inferior mechanical durability result; therefore, such a proportion is not preferred. When the proportion is more than 20 mole %, a rapid gelation takes place when a polymer is produced by polyester polycondensation, etc., making difficult to control an intended reaction; therefore, such a proportion is not preferred.

When the proportion of the polyhydric alcohol-derived atomic group represented by the chemical formula (4) is less than 15 mole %, a higher density and inferior grindability result; therefore, such a proportion is not preferred from the standpoint of productivity.

When the proportion is more than 60 mole %, a lower density and inferior mechanical durability result; therefore, such a proportion is not preferred.

When the proportion of the crosslinking group represented by the chemical formula (6) is less than 0.1 mole %, an intended crosslinking reaction hardly takes place, the proportion of the high-molecular polymer component obtained is small, and inferior offset resistance and inferior mechanical durability result; therefore, such a proportion is not preferred. When the proportion is more than 20 mole %, the intended crosslinking reaction is difficult to control; therefore, such a proportion is not preferred.

In the linear aromatic polyester resin component [(component (a-2)] comprised in the binder resin component [component (A)] used in the present invention, it is necessary that the polyhydric alcohol-derived atomic groups comprise 40 to 85 mole % of a polyhydric alcohol-derived atomic group represented by the chemical formula (2) and 15 to 60 mole % of a polyhydric alcohol-derived atomic group represented by the chemical formula (4), each mole % being based on the total moles of all the polyhydric alcohol-derived atomic groups present in the molecule of the component (a-2). When the proportion of the polyhydric alcohol-derived atomic group represented by the chemical formula (2) is less than 40 mole %, a lower density and inferior mechanical durability result; therefore, such a proportion is not preferred. When the proportion is more than 85 mole %, a higher density and inferior grindability result; therefore, such a proportion is not preferred from the standpoint of productivity.

When the proportion of the polyhydric alcohol-derived atomic group represented by the chemical formula (4) is less than 15 mole %, a higher density and inferior grindability result; therefore, such a proportion is not preferred from the standpoint of productivity.

When the proportion is more than 60 mole %, a lower density and inferior mechanical durability result; therefore, such a proportion is not preferred.

In the binder resin component [component (A)] used in the present invention, the proportions of the crosslinked aromatic polyester resin component [component (a-1)] and the linear aromatic polyester resin component [component (a-2)] need to be 5 to 80% by weight [the component (a-1)] and 20 to 95% by weight [the component (a-2)]. Preferably, the component (a-1) is 10 to 70% by weight and the component (a-2) is 30 to 90% by weight. More preferably, the component (a-1) is 20 to 60% by weight and the component (a-2) is 40 to 80% by weight.

When the proportion of the component (a-1) is less than 5% by weight, the amount of the high-molecular polymer component formed is insufficient and inferior offset resistance results; therefore, such a proportion is not preferred. When the proportion of the component (a-2) is less than 20% by weight, the amount of the low-molecular polymer component formed is insufficient and inferior fixing properties result; therefore, such a proportion is not preferred. Further, such a proportion of the component (a-2) is not preferred because a shoulder or peak having the maximum of differential curve in a temperature range of 100 to 180° C. hardly appears in a temperature range of 80 to 200° C.

The binder resin component [component (A)] used in the present invention needs to have such a viscoelasticity that, in the curve obtained by using the axis of abscissas as temperature and the axis of ordinates as logarithm of G' (storage modulus), a shoulder or peak having the maximum of the differential curve in a temperature range of 100 to 180° C. appears in a temperature range of 80 to 200° C.

Thereby, the viscosity when the binder resin component is melt-kneaded with a wax, a coloring agent component, etc., becomes larger than the viscosity in which no shoulder or peak having the maximum of differential curve in a temperature range of 100 to 180° C. appears in a temperature range of 80 to 200° C., and very good dispersion of wax, coloring agent, etc. is obtained.

The binder resin component [component (A)] used in the present invention needs to have a wide molecular weight distribution, that is, a Mw/Mn (molecular weight distribution) of 6 to 100, preferably 12 to 100 as measured by GPC (gel permeation chromatography using a polystyrene as the standard substance). When the Mw/Mn is less than 6, insufficient offset resistance results; therefore, such an Mw/Mn is not preferred.

The binder resin component [component (A)] used in the present invention needs to have a peak molecular weight of 1,000 to 8,000 as measured by GPC. When the peak molecular weight is less than 1,000, inferior offset resistance and inferior mechanical durability result; therefore, such a peak molecular weight is not preferred. When the peak molecular weight is more than 8,000, inferior fixing properties results and the shoulder or peak having the maximum of differential curve in a temperature range of 100 to 180° C. hardly appears in a temperature range of 80 to 200° C.; therefore, such a peak molecular weight is not preferred.

The binder resin component [component (A)] used in the present invention needs to contain therein a tetrahydrofuran (THF) insoluble portion at 25° C. in an amount of 0.1 to 40% by weight. When the amount of THF insoluble portion is less than 0.1% by weight, inferior offset resistance results; therefore, such an amount is not preferred. When the amount is more than 40% by weight, inferior fixing properties result; therefore, such an amount is not preferred.

The binder resin component [component (A)] used in the present invention needs to have a Tg (glass transition temperature) of ordinarily 40 to 70° C. when the Tg is less than 40° C., the resulting toner causes agglomeration of toner particles, which is called blocking; therefore, such a Tg is not preferred. When the Tg is more than 70° C., inferior fixing properties result; therefore, such a Tg is not preferred.

The binder resin component [component (A)] used in the present invention has a density of 1.22 to 1.27 g/cm$^3$ and, in a more preferred embodiment, 1.23 to 1.27 g/cm$^3$.

A density of less than 1.22 g/cm$^3$ is not preferred because inferior mechanical durability results. A density of more than 1.27 g/cm$^3$ is not preferred, either, from the standpoint of productivity because inferior grindability results.

The binder resin component [component (A)] used in the present invention needs to have an OH value of 0 to 100 KOH mg/g, preferably 0 to 70 KOH mg/g, more preferably 0 to 50 KOH mg/g. An OH value of more than 100 KOH mg/g is not preferred because higher hygroscopicity and lower charge stability at high temperatures and high humidities result.

Incidentally, in the present invention, OH value refers to mg of the potassium hydroxide required to neutralize the acid anhydride required to esterify the OH group present in 1 g of the binder resin component [component (A)].

The recycled PET (polyethylene terephthalate) or recycled PBT (polybutylene terephthalate) used as a raw material in the present invention is obtained by processing a recycled PET or PBT into a flake form and has a weight-average molecular weight of about 30,000 to 90,000. However, it has no restriction as to the molecular weight distribution, composition, production process, form when used, etc. The PET or PBT used in the present invention need not be restricted to a recycled PET or PBT.

In obtaining the crosslinked aromatic polyester resin [component (a-1)] and linear aromatic polyester resin [component (a-2)] used in the present invention, by depolymerization and/or polycondensation, it is possible to add as necessary an esterification catalyst, an ester interchange catalyst and a polymerization catalyst, all known generally. There are mentioned, for example, dibutyl tin oxide, antimony trioxide, tin acetate, zinc acetate, magnesium acetate, manganese acetate and germanium dioxide.

Preferably, the crosslinked aromatic polyester resin [component (a-1)] and linear aromatic polyester resin [component (a-2)] used in the present invention are produced by depolymerization and/or polycondensation at 200 to 270° C., preferably at 220 to 260° C.

In general, a reaction temperature of lower than 200° C. is not preferred because, at such a reaction temperature, the solubility of aromatic polyester (e.g. PET or PBT) during depolymerization is lower (this results in a longer reaction time) and the solubility of acid component (e.g. terephthalic acid) in polyhydric alcohol is lower as well.

In general, a reaction temperature of higher than 270° C. is not preferred because it incurs decomposition of the raw materials.

As to the process for producing a polyester resin having a wide molecular weight distribution, according to the present invention, there is described a process in which a linear aromatic polyester and an aromatic polyester to be crosslinked later are first produced, they are mixed, and the resulting mixture is subjected to a urethanization reaction with a polyisocyanate. Besides this process, it is possible to use other processes, for example, a process in which a reaction between an aromatic polyester to be crosslinked and a polyisocyanate is conducted before mixing with a linear aromatic polyester, and a process in which an acid-terminated polyester is subjected to a chain-extending reaction with glycidyl groups or a high molecular poymer is produced merely with a trifunctional monomer.

In the present invention, as the acid components used in the crosslinked aromatic polyester resin [component(a-1)] and the linear aromatic polyester resin [component (a-2)], terephthalic acid represented by the chemical formula (1) is always used, and any other acid conventionally used in production of polyester resin can also be used. As preferable acids other than terephthalic acid, there can be mentioned, for example, alkyldicarboxylic acids such as malonic acid, succinic acid, glutaric acid, adipic acid, azelaic acid, sebacic acid, azelaic acid and the like; unsaturated dicarboxylic acids such as maleic acid, fumaric acid, citraconic acid, itaconic acid and the like; benzenedicarboxylic acids such as phthalic acid, isophthalic acid and the like; and anhydrides or lower alkyl esters of these dicarboxylic acids.

It is also possible to use a monocarboxylic acid and a tri- or higher carboxylic acid for the purpose of molecular weight control. As preferred monocarboxylic acids, there are mentioned aliphatic monocarboxylic acids such as octanoic acid, decanoic acid, dodecanoic acid, myristic acid, palmitic acid, stearic acid and the like, and they may have branches or unsaturated groups. These aliphatic monocarboxylic acids have an action of giving a reduced glass transition temperature; therefore, for the purpose of control of glass transition temperature, an aromatic monocarboxylic acid such as benzoic acid, naphthalenecarboxylic acid or the like may be used. As the tri- or higher carboxylic acid, there are mentioned, for example, trimellitic acid, pyromellitic acid and acid anhydrides thereof.

In the present invention, of the alcohol components used in the crosslinked aromatic polyester resin [component (a-1)] and the linear aromatic polyester resin [component (a-2)], there are preferred, as the monomer capable of forming an atomic group represented by the chemical formula (2), for example, ethylene glycol which is a monomer capable of forming an atomic group represented by the chemical formula (2'), contained in PET, and 1,4-butanediol contained in PBT. There can also be mentioned other aliphatic dihydric alcohols, for example, 1,2-propanediol, 1,3-propanediol, 1,3-butanediol, 2,3-butanediol, diethylene glycol, triethylene glycol, dipropylene glycol, 1,5-pentanediol, 1,6-hexanediol, neopentyl glycol and 2-ethyl-1,3-hexanediol.

As the monomer capable of forming an atomic group represented by the chemical formula (3), there can be mentioned, for example, trimethylolpropane [which is a monomer capable of forming an atomic group represented by the chemical formula (3')], glycerine, 2-methylpropanetriol and trimethylolethane.

As the monomer capable of forming an atomic group represented by the chemical formula (4), there can be mentioned, for example, a propylene oxide adduct of bisphenol A obtained by adding one mole of propylene oxide to each terminal of bisphenol A which is a monomer capable of forming an atomic group represented by the chemical formula (4'), a propylene oxide adduct of bisphenol A obtained by adding one mole of propylene oxide to one terminal of bisphenol A and two moles of propylene oxide to the other terminal of bisphenol A which is a monomer capable of forming an atomic group represented by the chemical formula (4"). The other monomers, such as, a propylene oxide adduct of bisphenol A obtained by adding many moles of propylene oxide to both terminals of bisphenol A and an ethylene oxide adduct of bisphenol A obtained by adding many moles of ethylene oxide to both terminals of bisphenol A, can also be used.

In the above alkylene oxide adducts, it is necessary that the carbon atoms in the alkylene oxide unit are 2 to 10 and that the number of addition [the total of n and m in the chemical formula (4)] is an integer of 2 to 20.

Besides the above aliphatic dihydric alcohols, aliphatic trihydric alcohols, propylene oxide (2 moles) adduct of bisphenol A, propylene oxide (3 moles) adduct of bisphenol A, etc., there can be used all of the polyhydric alcohols conventionally used in production of polyester resin, for example, alicyclic diols such as cyclohexanedimethanol, hydrogenated bisphenol A and the like; derivatives of bisphenol F or bisphenol S, such as, alkylene oxide adducts of bisphenol F or bisphenol S, which are obtained by adding alkylene oxide, such as ethylene oxide, propylene oxide or the like, to the bisphenols; aromatic diols such as bishydroxyethylterephthalic acid, bishydroxypropylterephthalic acid, bishydroxybutylterephthalic acid and the like; and tetrahydric or higher alcohols such as pentol (pentaerythritol), sorbitol, sorbitan and the like. Monohydric alcohols can also be used for molecular weight control.

As preferred monohydric alcohols, there can be mentioned aliphatic monohydric alcohols such as octanol, decanol, dodecanol, myristyl alcohol, palmityl alcohol, stearyl alcohol, oleyl alcohol and the like. They may have branches and unsaturated groups.

As the monomer capable of forming an atomic group represented by the chemical formula (5), there can be mentioned, for example, tolylene diisocyanate which is a monomer capable of forming an atomic group represented by the chemical formula (5'), and other diisocyanates such as hexamethylene diisocyanate, isophorone diisocyanate, diphenylmethane diisocyanate, xylylene diisocyanate, tetramethylene diisocyanate and the like. Tri- or higher isocyanates can also be used.

Preferably, at least one kind of long-chain aliphatic monohydric alcohol or long-chain aliphatic monocarboxylic acid is allowed to be present in the polycondensation in an amount of 2 to 20 mole % based on the total alcohol components or the total carboxylic acid components. The amount of the long-chain aliphatic monohydric alcohol or long-chain aliphatic monocarboxylic acid used is preferably 2 to 20 mole % based on the total raw material monomers. When the amount is less than 2 mole %, the effects of resistance against sticking to a heated roll and wax dispersion obtained are small; when the amount is more than 20 mole %, the monofunctional compound impairs polymerization, making difficult to obtain a high-molecular polymer; therefore, such amounts are not preferred.

In the present invention, the depolymerization reaction and/or polycondensation reaction for obtaining the crosslinked aromatic polyester resin [component (a-1)] or the linear aromatic polyester resin [component (a-2)] can be conducted by a known process such as solvent-free high-temperature polycondensation, solution polycondensation or the like in an inert gas such as nitrogen gas or the like. In the reaction, the proportions of the acid monomer and alcohol monomer used are generally 0.7 to 1.4 in terms of the molar ratio of the hydroxyl group of the latter to the carboxyl group of the former.

The toner comprising the toner composition of the present invention can contain as necessary, besides the above-mentioned binder resin component [component (A)] and a coloring agent component (B), materials ordinarily used in toner production, such as known binder resin other than the component (A), charge-controlling agent, wax, magnetic material, surface-treating agent and the like.

The other resin which can be used together with the binder resin component [component (A)], can be any resin which has heretofore been known as a binder resin for toner. There can be mentioned, for example, homopolymers of styrene or its derivative, such as polystyrene, poly-p-chlorostyrene, polyvinyltoluene and the like; styrene copolymers such as styrene-p-chlorostyrene copolymer, styrene-vinyltoluene copolymer, styrene-vinylnaphthalene copolymer, styrene-acrylic acid ester copolymer, styrene-methacrylic acid ester copolymer, styrene-methyl a-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer and the like; and resins such as polyvinyl chloride, phenolic resin, natural modified phenolic resin, natural resin-modified maleic acid resin, acrylic resin, methacrylic resin, polyvinyl acetate, silicone resin, polyester resins other than mentioned above, polyurethane resin, polyamide resin, furan resin, epoxy resin, xylene resin, polyvinyl butyral, terpene resin, coumarone-indene resin, petroleum-based resin, crosslinked styrene copolymer and the like. Naturally, these resins can be used in such an amount that the properties of the toner composition of the present invention are exhibited.

As the charge-controlling agent used in production of the toner composition of the present invention, known charge-controlling agents can be used singly or in combination. The charge-controlling agent is used in an amount necessary to allow the toner produced, to have an intended charge amount. It is used in an amount of, for example, about 0.05 to 10 parts by weight per 100 parts by weight of the binder resin. As the positive charge-controlling agent, there can be mentioned, for example, nigrosine type dyes, quaternary ammonium salt compounds, triphenylmethane type compounds, imidazole type compounds and polyamine resins. As the negative charge-controlling agent, there can be mentioned, for example, metal (e.g. Cr, Co, Al or Fe)-containing azo type dyes, metal salicylate compounds, metal alkylsalicylate compounds and calix arene compounds.

In producing the toner composition of the present invention, there can be used, as the coloring agent [component (B)], any coloring agent which has heretofore been known in toner production. As examples thereof, there can be mentioned dyes and pigments, such as fatty acid metal salts, various carbon blacks, phthalocyanine type dyes, rhodamine type dyes, quinacridone type dyes, triallylmethane type dyes, anthraquinone type dyes, azo type dyes, diazo type dyes and the like. These coloring agents can be used singly or in combination of two or more kinds.

The magnetic material which can be used in production of the toner composition of the present invention, can be any of alloys, compounds, etc. each containing a ferromagnetic element, which have heretofore been used in production of magnetic toner. As examples of the magnetic material, there can be mentioned iron oxides or compounds between bivalent metal and iron oxide, such as magnetite, maghemite, ferrite and the like; metals such as iron, cobalt, nickel and the like; alloys between such a metal and other metal such as aluminum, cobalt, copper, lead, magnesium, tin, zinc, antimony, beryllium, bismuth, cadmium, calcium, manganese, selenium, titanium, tungsten, vanadium or the like; and mixtures thereof. These magnetic materials have an average particle diameter of preferably about 0.1 to 2 $\mu$m, more preferably about 0.1 to 0.5 $\mu$m. The content of the magnetic material in the toner is ordinarily about 20 to 200 parts by weight, preferably 40 to 150 parts by weight per 100 parts by weight of the binder resin.

The saturation magnetization of the toner is preferably 15 to 35 emu/g (measurement magnetic field: 1 kilo oersted).

As the wax usable in production of the toner composition of the present invention, there can be mentioned, for example, wax-like substances such as low-molecular polyethylene, low-molecular polypropylene, microcrystalline wax, carnauba wax, sazol wax, paraffin wax and the like. These substances are added into the toner ordinarily in an amount of about 0.5 to 20 parts by weight per 100 parts by weight of the binder resin.

A surface-treating agent may be added in production of the toner composition of the present invention. The surface-treating agent added is present between the toner and a carrier or in the toner, whereby the powder fluidity and life of developing agent can be improved. As specific examples of the surface-treating agent, there can be mentioned fine powders of colloidal silica, alumina, titanium oxide, polytetrafluoroethylene, polyvinylidene chloride, polymethyl methacrylate, polystyrene ultrafine particles and silicone. As commercial products, there are, for example, AEROSIL 130, 200, 200V, 200CF, 200FAD, 300, 300CF, 380, R972, R972V, R972CF, R974, R976, RX200, R200, R202, R805, R812, R812S, TT600, MOX80, MOX170, COK84, titanium oxide T805 and titanium oxide P25 (these are products of Nippon Aerosil Co., Ltd. and Degussa Japan Co., Ltd.); and CAB-O-SIL L90, LM130, LM150, M5, PTG, MS55, H5, HS5, LM150D, M7D, MS75D, TS720, TS610 and TS530 (these are products of CABOT Corp.). The specific surface area of the surface-treating agent is preferably 30 $m^2$/g or more, particularly 50 to 400 $m^2$/g as measured by nitrogen adsorption using the BET method. The amount of the surface-treating agent used is preferably 0.1 to 20 parts by weight per 100 parts by weight of the binder resin.

In order to produce the toner composition of the present invention, the toner composition of the present invention and, as necessary, other additives are sufficiently mixed using a powder mixer. The resulting mixture is melt-kneaded using a kneading machine (e.g. a hot roll, a kneader or a twin screw extruder), at a predetermined kneader temperature of 100 to 200° C., preferably 120 to 180° C., more preferably 130 to 170° C. to sufficiently mix the individual components. The melt-kneaded material is cooled, ground, and sieved to collect particles having particle diameters of ordinarily 5 to 20 $\mu$m. The collected particles are coated with a surface-treating agent using a powder mixer, to obtain a toner.

To the toner obtained by using the toner composition of the present invention can be applied various development methods, for example, a cascade development method, a magnetic brush development method, a powder cloud development method, a touch-down development method, a so-called micro-toning development method using, as a carrier, a magnetic toner produced by grinding, and a so-called bipolar magnetic toner development method in which a required amount of toner charges are obtained by the friction between magnetic toner particles. The development methods are not restricted thereto.

To the toner obtained by using the toner composition of the present invention can be applied to various fixing methods, for example, an oil-free or oil-coated heat roll fixing method, a flash fixing method, an oven fixing method, and a pressure fixing method.

To the toner obtained by using the toner composition of the present invention can be applied various cleaning methods, for example, a so-called fur brush method and a blade method.

EXAMPLES

The present invention is described specifically below by way of Examples and Comparative Examples. However, the following Examples are for merely explaining the present invention and the present invention is not restricted to these Examples. In the following tables, analyses of resin properties and evaluations of toner properties were made as follows.

The glass transition temperature (Tg) of a binder resin component [component (A)] was measured using DSC-20 (a product of Seiko Instruments Inc.) according to differential scanning calorimetry (DSC). About 10 mg of a sample was subjected to temperature elevation from −20° C. to 100° C. at a rate of 10° C./min to obtain a curve; in the curve, an intersection between the base line and the inclined line of the endothermic peak was determined; the Tg of the sample was determined from the intersection. It is desired that, before the above temperature elevation measurement, the sample resin is heated to about 200° C., is kept at that temperature for 5 minutes, and is cooled quickly to normal temperature (25° C.), in order to allow the sample to have a given thermal history.

The acid value of a binder resin component [component (A)] refers to mg of potassium hydroxide necessary to neutralize 1 g of the component. The HO value of a binder resin component [component (A)] refers to mg of potassium hydroxide necessary to neutralize the acid anhydride necessary to esterify the OH group present in 1 g of the component.

The measurement of acid value is conducted, for example, by neutralization titration in accordance with JIS (Japanese Industrial Standard). Naturally, it is necessary to use a solvent having high solvency for resin, and a mixed solvent of xylene/dimethylformamide=1/1 (weight ratio) is preferred particularly. The end point of titration may be determined by using an indicator or by potentiometry.

The measurement of OH value is conducted, for example, by back titration using an acid anhydride in accordance with JIS. It is particularly preferred to use phthalic anhydride as the acid anhydride and imidazole as the catalyst. Pyridine is used as a solvent for dissolving the acid anhydride and the catalyst, and the resulting solution is used as a reaction agent. The reaction agent is reacted with a sample resin. Thereafter, it is of course necessary that the reaction mixture is diluted with a solvent having excellent solvency for resin, such as pyridine, tetrahydrofuran (THF) or the like.

The molecular weight and molecular weight distribution of a binder resin component [component (A)] was determined by gel permeation chromatography (GPC).

The measurement conditions of GPC were as follows.
Tester: SHODEX GPC SYSTEM-21
  Detector: a differential refractive index detector, SHODEX R1-71S
  Solvent: tetrahydrofuran
  Column: SHODEX KF-G+KF-807L×3+KF800D
  Column temperature: 40° C.
  Flow rate: 1.0 ml/min
  Sample: 0.2 wt. % tetrahydrofuran solution
In the GPC data obtained, a molecular weight having the largest relative strength is taken as peak molecular weight, and a weight-average molecular weight (Mw) and a number-average molecular weight (Mn) are determined from the measurement data.

Incidentally, the reliability of the measurement can be confirmed by obtaining Mw/Mn=2.11±0.10 when an NBC polystyrene sample (Mw=288,000, Mn=137,000, Mw/Mn=2.11) has been subjected to GPC under the above measurement conditions.

The THF insoluble portion of a binder resin component [component (A)] was obtained by the following measurement method. A tetrahydrofuran solution containing 5% by weight of the resin component was prepared; the solution was stirred sufficiently to dissolve the soluble portion of the resin completely in the solvent at 25° C.; then, the solution was allowed to stand.

After confirming that the insoluble portion of the resin and the supernatant liquid were separated completely, the supernatant liquid was analyzed and the amount of the soluble portion was calculated; thereby, the insoluble portion was determined.

The density of the binder resin component [component (A)] was measured according to the method A of JIS K 6268.

The resin component was controlled for humidity at normal temperature and normal humidity (temperature=22° C., relativity humidity=55%) for 48 hours or more; the resulting material was pressed at 120° C. so that no air bubble was generated, to prepare a sheet of 3 mm in thickness; a test piece of about 0.1 g was cut out from the sheet; and measurement was made for the test piece.

The viscoelasticity of the binder resin component [component (A)] was measured using Stress Tech Rheometer of ReoLogica Instruments AB. The measurement was made by subjecting parallel plates to temperature elevation from 50° C. to 200° C. at a rate of 2° C./min under the conditions of gap=1 mm, angular frequency=1 Hz and stress strain=1%. Using the measurement result, a curve was prepared by using the axis of abscissas as temperature and the axis of ordinates as logarithm of G' (storage modulus). A case when, in the curve prepared above, a shoulder or peak having the maximum of the differential curve at 100 to 180° C. appeared at 80 to 200° C., was rated as ○; and a case when no such shoulder or peak appeared, was rated as ×.

The grindability of a toner was evaluated as follows. A sample of a coarsely ground toner having uniform particle diameters of 0.60 to 1.00 mm was jet-ground under given conditions; the resulting material was measured for volume-average particle diameter; and the diameter was rated according to the following standard. Incidentally, volume-average particle diameter was determined using a Coulter Counter.
  ○: 11 μm≧volume-average particle diameter≧7 μm
  Δ: 7 μm>volume-average particle diameter≧5 μm
    13 μm≧volume-average particle diameter>11 μm
  ×: 5 μm>volume-average particle diameter
    volume-average particle diameter>13 μm The fixing properties of a toner was evaluated as follows. An unfixed image was formed using a copier produced by remodeling a commercial electrophotograph copier. This unfixed image was fixed using a hot roller fixing apparatus produced by remodeling of the fixing section of a commercial copier. The fixing was conducted at a fixing speed of the hot roll, of 210 mm/sec with the temperature of the hot roller being changed at intervals of 5° C. The fixed image obtained was rubbed 10 times by applying a load of 0.5 kg using a special eraser (a sand eraser) of Tombow Pencil Co., Ltd., and the image densities before and after the rubbing test were measured using a Macbeth reflection densitometer. The lowest fixing temperature when the change of image density became 70% or more, was taken as the lowest fixing temperature of the toner. Incidentally, the hot roller fixing apparatus used had no silicone oil feeder. The environmental conditions were normal temperature and normal humidity (temperature=22° C., relative humidity=55%).
  ○: lowest fixing temperature≦150° C.
  Δ: 190° C.≧lowest fixing temperature>150° C.
  ×: lowest fixing temperature>190° C.

The offset resistance of a toner was evaluated as follows. According to the above measurement of the lowest fixing temperature, an unfixed image was formed using the above copier; the toner image was transferred and fixed using the above hot roller fixing apparatus; then, a white transfer paper was fed into the hot roller fixing apparatus under the same conditions, and the appearance of toner staining the transfer paper was visually examined. This operation was repeated by gradually increasing the set temperature of the hot roller of the hot roller fixing apparatus. The lowest set temperature at which toner staining appeared on the transfer paper was taken as the temperature of offset appearance.

The environmental conditions were normal temperature and normal humidity (temperature=22° C., relative humidity=55%).

○: temperature of offset appearance≧240° C.
Δ: 240° C.>temperature of offset appearance≧220° C.
×: 220° C.>temperature of offset appearance The blocking resistance of a toner was evaluated as follows. A toner was allowed to stand under the environmental conditions of temperature=50° C. and relative humidity=60%; 5 g of the resulting toner was placed on a 150-mesh sieve and vibrated for 1 minute using a powder tester of Hosokawa Micromeritics Laboratory with the scale of the variable resistor set at 3; and the weight of the toner remaining on the 150-mesh sieve after the vibration was measured and a ratio of remaining weight was determined.

○: 20%>ratio of remaining weight
Δ: 35%≧ratio of remaining weight≧20%
×: ratio of remaining weight>35%

The mechanical durability of a toner was evaluated as follows. A sample (10 g) of a coarsely ground toner having uniform particle diameters of 0.60 to 1.00 mm was placed in a laboratory grinder (a product of IKA) and agitated for 30 seconds; the proportion of the finely ground toner having particle diameters of 106 μm or less was determined; therefrom was evaluated the mechanical durability of the toner. The standard of the evaluation used is shown below.

○: 20% by weight or less
Δ: more than 20% by weight but not more than 30% by weight
×: more than 30% by weight The wax dispersibility of a toner was evaluated by observing a sample of a toner using a transmission type electron microscope to determine the particle diameters of the dispersed wax in the toner sample. The standard of the evaluation used is shown below.

○: 2 μm≧particle diameters of dispersed wax
Δ: 5 μm≧particle diameters of dispersed wax>2 μm
×: particle diameters of dispersed wax>5 μm The development durability of a toner was evaluated by filling a toner in a commercial electrophotograph copier, then conducting continuous copying, and visually examining the number of sheets fed from the start to the time when the deterioration of image quality, i.e. the staining of background began. The standard of the evaluation used is shown below.

○: sheets from start to image quality deterioration≧100,000 sheets
Δ: 100,000 sheets>sheets from start to image quality deterioration≧10,000 sheets
×: 10,000 sheets>sheets from start to image quality deterioration Resins giving crosslinked aromatic polyesters a-1 when crosslinked with chemical formula (6), and linear aromatic polyester resins a-2 were produced as follows. The production of a resin A-1 is described specifically. In Table 1 and Table 2 are shown the resin units, monomer compositions, reaction temperatures, resin analytical results of A-2 to A-6 and B-1 to B-6, together with those of A-1.

A 5-liter, 4-necked flask was provided with a reflux condenser, a water-separating unit, a nitrogen gas inlet tube, a thermometer and a stirrer. Thereinto were fed 53.0 mole % of a recycled PET flake (weight-average molecular weight: 75,000) (the mole % was based on the ethylene glycol unit in the PET), 23.0 mole % of Actcol KB300 (a product of Mitsui Takeda Chemicals, Inc.), 20.0 mole % of triethylene glycol, 4.0 mole % of trimethylolpropane and 32.0 mole % of terephthalic acid. Further, dibutyl tin oxide was fed in an amount of 0.3 part by weight per 100 parts by weight of the total monomers fed. Depolymerization and/or dehydration and polycondensation was conducted at 240° C. with nitrogen being introduced into the flask. When the acid value of the reaction mixture reached a predetermined level, the reaction mixture was taken out of the flask, cooled, and ground to obtain a resin A-1. The resin had a Tg of 32.0° C., an acid value of 1 KOH mg/g, an OH value of 48 KOH mg/g and a density of 1.24 g/cm$^3$.

TABLE 1

Production of resins which give crosslinked aromatic polyesters (a-1) when crosslinked with chemical formula (6)

| Resins | A-1 | A-2 | A-3 | A-4 | A-5 | A-6 |
|---|---|---|---|---|---|---|
| PET (mole %) | 53.0 | — | — | — | 26.5 | 59.6 |
| PBT (mole %) | — | — | — | 53.0 | 26.5 | — |
| KB300 (mole %) | 23.0 | 27.7 | 77.4 | 23.0 | 23.0 | 25.5 |
| Diethylene glycol (mole %) | — | 64.4 | 10.9 | — | — | — |
| Triethylene glycol (mole %) | 20.0 | — | — | 20.0 | 20.0 | 4.3 |
| Trimethylolpropane (mole %) | 4.0 | 7.9 | 11.7 | 4.0 | 4.0 | 10.6 |
| Terephthalic acid (mole %) | 32.0 | — | — | 32.0 | 32.0 | 29.3 |
| Isophthalic acid (mole %) | — | 84.2 | 85.7 | — | — | — |
| Benzoic acid (mole %) | — | — | 20.1 | — | — | 19.5 |
| Reaction temperature (° C.) | 240 | 240 | 240 | 240 | 240 | 240 |
| Tg (° C.) | 32.0 | 25.6 | 51.2 | 27.7 | 29.8 | 45.4 |
| Acid value (KOH mg/g) | 1 | 1 | 2 | 1 | 1 | 2 |
| OH value (KOH mg/g) | 48 | 52 | 20 | 48 | 48 | 18 |
| Density (g/cm$^3$) | 1.24 | 1.22 | 1.22 | 1.24 | 1.24 | 1.22 |

TABLE 2

Production of linear aromatic polyester resin components (a-2)

| Resins | B-1 | B-2 | B-3 | B-4 | B-5 | B-6 |
|---|---|---|---|---|---|---|
| PET (mole %) | 70.0 | 70.0 | — | — | 35.0 | 30.0 |
| PBT (mole %) | — | — | — | 70.0 | 35.0 | 0.0 |
| KB300 (mole %) | 30.0 | 30.0 | 100.0 | 30.0 | 30.0 | 70.0 |
| Terephthalic acid (mole %) | 26.0 | 35.0 | — | 26.0 | 26.0 | 68.0 |

TABLE 2-continued

Production of linear aromatic polyester resin components (a-2)

| Resins | B-1 | B-2 | B-3 | B-4 | B-5 | B-6 |
|---|---|---|---|---|---|---|
| Isophthalic acid (mole %) | — | — | 102.3 | — | — | 0.0 |
| Benzoic acid (mole %) | 18.0 | 5.0 | 18.7 | 18.0 | 18.0 | 18.0 |
| Reaction temperature (° C.) | 240 | 250 | 240 | 240 | 240 | 250 |
| Tg (° C.) | 55.0 | 68.0 | 56.1 | 51.4 | 53.1 | 59.7 |
| Acid value (KOH mg/g) | 20 | 30 | 25 | 20 | 20 | 22 |
| OH value (KOH mg/g) | 3 | 3 | 2 | 3 | 3 | 3 |
| Density (g/cm$^3$) | 1.24 | 1.24 | 1.22 | 1.24 | 1.24 | 1.22 |

The embodiments of the present invention are described specifically for a representative case, i.e., Example 1. Also for resins 2 to 11, i.e. Examples 2 to 5 and Comparative Examples 1 to 6, resins and toners were obtained and evaluated in the same manner as in Example 1. For Examples 2 to 5 and Comparative Examples 1 to 6, the proportions of resin a-1 and resin a-2, the ratios of tolylene diisocyanate added, the results of resin analysis, and the properties of toner are shown in Table 3 and Table 4, together with those of Example 1. Incidentally, the resin 10 contained no resin a-1 and therefore no tolylene diisocyanate was added thereinto; and the resin 11 contained no resin a-2.

Production of resin 1.

40 parts by weight of resin A-1, 60 parts by weight of resin B-1, and 8.2 mole % (based on the total moles of the polyhydric alcohol-derived atomic group in the resin A-1) of tolylene diisocyanate were kneaded and reacted in a twin screw extruder to obtain resin 1. The resin had a Tg of 58.0C, a Mw/Mn of 29.1 as measured by GPC, and a peak molecular weight of 5,000. The resin also had a THF insoluble portion of 10% by weight and a density of 1.24 g/cm$^3$. Further, the resin was measured for viscoelasticity using a rheometer; a relation of G' (storage modulus) and temperature was determined and indicated graphically; the resulting graph confirmed the appearance of a shoulder or peak having the maximum of the differential curve, i.e. ΔG' in a temperature range of 100 to 180° C., in a temperature range of 80 to 200° C.

EXAMPLE 1

100 parts by weight of a resin 1, 6 parts by weight of a carbon black (MA-100, a product of Mitsubishi Chemical Corporation) and 3 parts by weight of a polypropylene wax (Viscol 660P, a product of Sanyo Chemical Industries, Ltd.) were dispersed and mixed using a Henschel mixer; the resulting material was melt-kneaded at 150° C. using a twin screw extruder (PCM-30, a product of Ikegai Corporation) to obtain a toner composition in the bulk state. A photograph of a sample of the toner composition was taken using a transmission type electron microscope, and the wax dispersibility in the toner composition was confirmed. The resin after melt-kneading was coarsely ground using a hammer mill. For a sample of the coarsely ground toner, the mechanical durability of the toner was confirmed. The coarsely ground resin was finely ground using a jet grinder (IDS 2, a product of Nippon Pneumatic mfg Co., Ltd.), followed by air classification, to obtain a toner fine powder having an average particle diameter of 10 μm (5 μm or less: 3% by weight, 20 μm or more: 2% by weight). The grindability of the toner was judged by conducting grinding with the feeding rate of coarsely ground powder into jet grinder being set at a constant level and then measuring a volume-average particle diameter. The toner fine powder and 0.1% of a hydrophobic silica (Aerosil R972, a product of Nippon Aerosil Co., Ltd.) were mixed using a powder blender to obtain toner particles. The toner particles were measured for viscoelasticity, blocking resistance, fixing properties, offset resistance and development durability.

TABLE 3

Properties of individual binder resins

| | | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| Resins | | Resin 1 | Resin 2 | Resin 3 | Resin 7 | Resin 8 | Resin 4 | Resin 5 | Resin 6 | Resin 9 | Resin 10 | Resin 11 |
| Resins a-1 | Kind | A-1 | A-1 | A-1 | A-4 | A-5 | A-1 | A-2 | A-3 | A-1 | — | A-6 |
| | (wt. %) | 40 | 40 | 40 | 40 | 40 | 40 | 40 | 70 | 40 | — | 100 |
| Resins a-2 | Kind | B-1 | B-1 | B-1 | B-4 | B-5 | — | — | — | — | B-1 | — |
| | (wt. %) | 60 | 30 | 12 | 60 | 60 | — | — | — | — | 100 | — |
| | Kind | — | B-2 | B-2 | — | — | B-2 | B-3 | B-3 | B-6 | — | — |
| | (wt. %) | — | 30 | 48 | — | — | 60 | 60 | 30 | 60 | — | — |
| Tolylene diisocyanate (mole %) | | 8.2 | 8.2 | 8.2 | 8.2 | 8.2 | 8.2 | 9.6 | 4.0 | 8.2 | — | 2.6 |
| Tg (° C.) | | 58.0 | 63.0 | 64.9 | 57.1 | 57.6 | 67.1 | 55.0 | 61.0 | 58.7 | 55.0 | 58.2 |
| GPC | Mw/Mn | 29.1 | 21.4 | 20.9 | 18.3 | 23.5 | 17.8 | 9.1 | 17.6 | 27.9 | 3.0 | 12.0 |
| | Peak | 5000 | 7000 | 8000 | 6000 | 5500 | 9000 | 5000 | 10000 | 5000 | 5000 | 10000 |
| THF insoluble portion(wt. %) | | 10 | 7 | 5 | 9 | 9 | 4 | 8 | 1 | 10 | 0 | 2 |
| Density (g/cm$^3$) | | 1.24 | 1.24 | 1.24 | 1.24 | 1.24 | 1.24 | 1.22 | 1.22 | 1.22 | 1.24 | 1.24 |
| Appearance of maximum in ΔG' | | ○ | ○ | ○ | ○ | ○ | X | X | X | X | ○ | X |

TABLE 4

Properties of toners produced using individual binder resins

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Resins | Resin 1 | Resin 2 | Resin 3 | Resin 7 | Resin 8 | Resin 4 | Resin 5 | Resin 6 | Resin 9 | Resin 10 | Resin 11 |
| Appearance of maximum in ΔG' | ○ | ○ | ○ | ○ | ○ | X | X | X | X | ○ | X |
| Grindability | ○ | ○ | ○ | ○ | ○ | ○ | ○ | ○ | ○ | ○ | Δ |
| Fixing properties | ○ | ○ | ○ | ○ | ○ | Δ | Δ | Δ | Δ | Δ | Δ |
| Offset resistance | ○ | ○ | ○ | ○ | ○ | ○ | ○ | ○ | ○ | X | ○ |
| Blocking resistance | ○ | ○ | ○ | ○ | ○ | ○ | ○ | ○ | ○ | ○ | ○ |
| Mechanical durability | ○ | ○ | ○ | ○ | ○ | ○ | Δ | Δ | Δ | X | ○ |
| Wax dispersibility | ○ | ○ | ○ | ○ | ○ | X | X | X | Δ | ○ | Δ |
| Development durability | ○ | ○ | ○ | ○ | ○ | X | X | X | Δ | X | Δ |

Examples 1 to 5 each falling in the scope of the present invention have satisfactory grindability, offset resistance and blocking resistance and are superior in fixing properties, mechanical durability, wax dispersibility and development durability.

Comparative Example 1 has a large peak molecular weight, that is, contains a linear aromatic polyester of large peak molecular weight; therefore, clear confirmation of the maximum of ΔG' was impossible. As a result, the wax dispersibility was inferior, and the fixing properties and development durability deteriorated.

Comparative Examples 2 and 3 contain no polyhydric alcohol-derived atomic group of the chemical formula (2); therefore, clear confirmation of the maximum of ΔG' is impossible and moreover the density is small. As a result, the wax dispersibility and mechanical durability were inferior, and the fixing properties and development durability deteriorated.

Comparative Example 4 deviates from the scope of the present invention in the proportion of the polyhydric alcohol-derived atomic group of the chemical formula (2); therefore, clear confirmation of the maximum of ΔG' is impossible and moreover the density is small. As a result, the wax dispersibility and mechanical durability were inferior, and the fixing properties and development durability deteriorated.

In Comparative Example 5, the maximum of ΔG' is confirmed clearly, the wax dispersibility is good, and the density is high. However, since the Mw/Mn is small, the offset resistance and mechanical durability deteriorated significantly, and the fixing properties deteriorated as well owing to the insufficient cohesive force. Simultaneously, the development durability deteriorated as well.

Comparative Example 6 contains no linear aromatic polyester and has a large peak molecular weight. Therefore, clear confirmation of the maximum of ΔG' was impossible. As a result, the wax dispersibility was inferior and the fixing properties and development durability deteriorated.

INDUSTRIAL APPLICABILITY

The present invention can provide an excellent toner composition for electrophotography, having all of the following properties which have been unable to obtain with conventional techniques:

(1) superior blocking resistance,
(2) superior offset resistance,
(3) superior grindability,
(4) superior mechanical durability,
(5) superior wax dispersibility, and
(6) superior balance between post-development fixing properties and development durability.

What is claimed is:

1. A toner composition comprising a binder resin component [component (A)] and a coloring agent component [component (B)], wherein
the binder resin component [component (A)] comprises a crosslinked aromatic polyester resin component [Component (a-1)] and a linear aromatic polyester resin component [component (a-2)],
the crosslinked aromatic polyester resin component [component (a-1)] is a crosslinked aromatic polyester resin having a recurring unit represented by the following chemical formula (1), the polyhydric alcohol-derived atomic group Q in the chemical formula (1) comprising 39.9 to 65 mole % of a polyhydric alcohol-derived atomic group represented by the following chemical formula (2), 0.1 to 20 mole % of a polyhydric alcohol-derived atomic group represented by the following chemical formula (3) and 15 to 60 mole % of a polyhydric alcohol-derived atomic group represented by the following chemical formula (4), each mole % being based on the total moles of all the polyhydric alcohol-derived atomic groups present in the molecule of the component (a-1), a crosslinking group represented by the following chemical formula (6) being present in the component (a-1) in an amount of 0.1 to 20 mole % based on the total moles of all the polyhydric alcohol-derived atomic groups present in the molecule of the component (a-1), and the recurring unit represented by the chemical formula (1) being crosslinked by the crosslinking group represented by the chemical formula (6),
the linear aromatic polyester resin component [component (a-2)] is a linear aromatic polyester resin having a recurring unit represented by the chemical formula (1), the polyhydric alcohol-derived atomic group Q in the chemical formula (1) comprising 40 to 85 mole % of a polyhydric alcohol-derived atomic group represented by the chemical formula (2) and 15 to 60 mole % of a polyhydric alcohol-derived atomic group represented by the chemical formula (4), each mole % being based on the total moles of all the polyhydric alcohol-derived atomic groups present in the molecule of the component (a-2), and
the proportions of the component (a-1) and the component (a-2) are 5 to 80% by weight [the component (a-1)] and 20 to 95% by weight [the component (a-2)] based on the total weight of the two components:

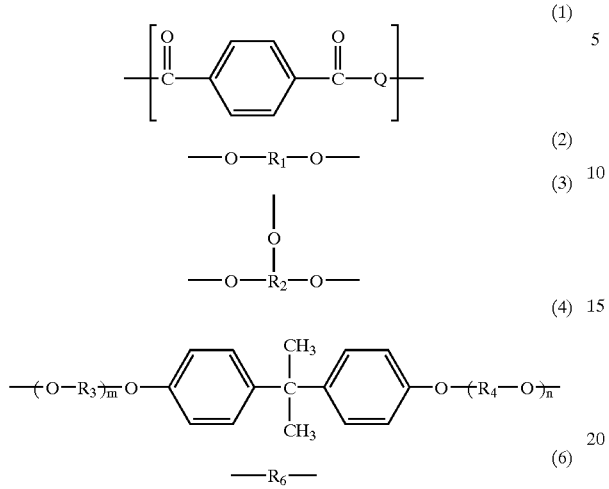

[wherein, in the chemical formula (1), Q is a polyhydric alcohol-derived atomic group; in the chemical formula (2), R1 is an atomic group having 2 to 10 carbon atoms; in the chemical formula (3), R2 is an atomic group having 3 to 10 carbon atoms; in the chemical formula (4), R3 and R4 may be the same or different and are each independently an atomic group having 2 to 10 carbon atoms; in the chemical formula (4), m and n may be the same or different and are each independently an integer of 1 to 10; and in the chemical formula (6), R6 is an atomic group having 1 to 20 carbon atoms which may be aliphatic or aromatic and which may comprise N, O and S as atoms other than C and H].

2. A toner composition comprising a binder resin component [component (A)] and a coloring agent component [component (B)], wherein
the binder resin component [component (A)] comprises a crosslinked aromatic polyester resin component [Component (a-1)] and a linear aromatic polyester resin component [component (a-2)],
the crosslinked aromatic polyester resin component [component (a-1)] is a crosslinked aromatic polyester resin having a recurring unit represented by the following chemical formula (1), the polyhydric alcohol-derived atomic group Q in the chemical formula (1) comprising 39.9 to 65 mole % of a polyhydric alcohol-derived atomic group represented by the following chemical formula (2), 0.1 to 20 mole % of a polyhydric alcohol-derived atomic group represented by the following chemical formula (3) and 15 to 60 mole % of a polyhydric alcohol-derived atomic group represented by the following chemical formula (4), each mole % being based on the total moles of all the polyhydric alcohol-derived atomic groups present in the molecule of the component (a-1), a crosslinking group represented by the following chemical formula (5) being present in the component (a-1) in an amount of 0.1 to 20 mole % based on the total moles of all the polyhydric alcohol-derived atomic groups present in the molecule of the component (a-1), and the recurring unit represented by the chemical formula (1) being crosslinked by the crosslinking group represented by the chemical formula (5),
the linear aromatic polyester resin component [component (a-2)] is a linear aromatic polyester resin having a recurring unit represented by the chemical formula (1), the polyhydric alcohol-derived atomic group Q in the chemical formula (1) comprising 40 to 85 mole % of a polyhydric alcohol-derived atomic group represented by the chemical formula (2) and 15 to 60 mole % of a polyhydric alcohol-derived atomic group represented by the chemical formula (4), each mole % being based on the total moles of all the polyhydric alcohol-derived atomic groups present in the molecule of the component (a-2), and
the proportions of the component (a-1) and the component (a-2) are 5 to 80% by weight [the component (a-1)] and 20 to 95% by weight [the component (a-2)] based on the total weight of the two components:

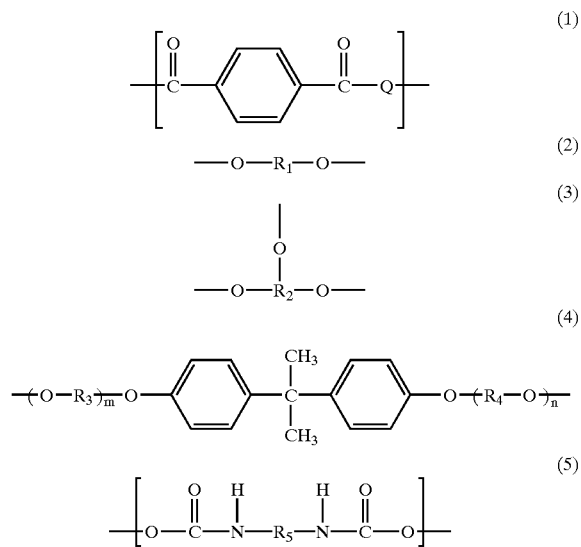

[wherein, in the chemical formula (1), Q is a polyhydric alcohol-derived atomic group; in the chemical formula (2), R1 is an atomic group having 2 to 10 carbon atoms; in the chemical formula (3), R2 is an atomic group having 3 to 10 carbon atoms; in the chemical formula (4), R3 and R4 may be the same or different and are each independently an atomic group having 2 to 10 carbon atoms; in the chemical formula (4), m and n may be the same or different and are each independently an integer of 1 to 10; and in the chemical formula (5), R5 is an atomic group having 6 to 20 carbon atoms which may be aliphatic or aromatic].

3. A toner composition according to claim 1, wherein the binder resin component [component (A)] has such a viscoelasticity that, in the curve obtained by using the axis of abscissas as temperature and the axis of ordinates as logarithm of G' (storage modulus), a shoulder or peak having the maximum of the differential curve in a temperature range of 100 to 180 appears in a temperature range of 80 to 200.

4. A toner composition according to claim 2, wherein the chemical formula (2) is the following chemical formula (2'), the chemical formula (3) is the following chemical formula (3'), the chemical formula (4) is the following chemical formula (4') and/or the following chemical formula (4"), and the chemical formula (5) is the following chemical formula (5'):

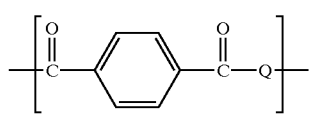 (1)

 (2')

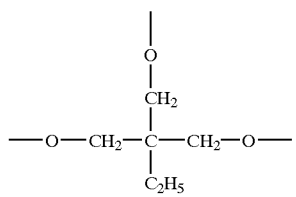 (3')

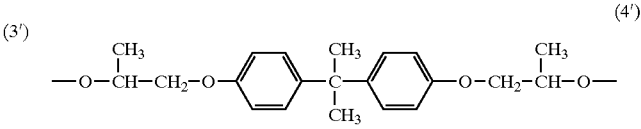 (4')

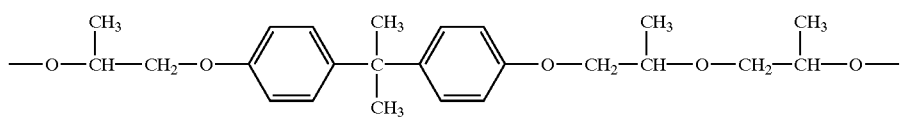 (4")

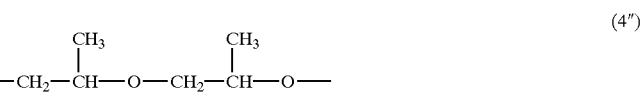 (5')

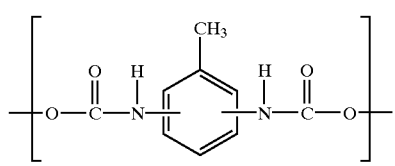

5. A toner composition according to claim 1, wherein the tetrahydrofuran (THF) soluble portion of the binder resin component [component (A)] has a molecular weight distribution (Mw/Mn) of 6 to 100 when measured by gel permeation chromatography (GPC).

6. A toner composition according to claim 1, wherein the tetrahydrofuran (THF) soluble portion of the binder resin component [component (A)] has a peak molecular weight of 1,000 to 8,000 when measured by gel permeation chromatography (GPC).

7. A toner composition according to claim 1, wherein the tetrahydrofuran (THF) insoluble portion of the binder resin component [component (A)] is 0.1 to 40% by weight in the binder resin component [component (A)].

8. A toner composition according to claim 1, wherein the binder resin component [component (A)] has a glass transition temperature (Tg) of 40 to 70.

9. A toner composition according to claim 1, wherein the binder resin component [component (A)] has a density of 1.22 to 1.27 g/cm$^3$.

10. A toner composition according to claim 1, wherein the binder resin component [component (A)] has an OH value of 0 to 100 KOH mg/g.

11. A process for producing a toner composition, which comprises:

a first step of depolymerizing an aromatic polyester having a recurring unit represented by the following chemical formula (II) with a polyhydric alcohol comprising a dihydric alcohol represented by the following chemical formula (VI) and a trihydric alcohol represented by the following chemical formula (VII), and thereafter or simultaneously therewith conducting polycondensation reaction in the presence of at least one carboxylic acid and at least one alcohol, and then adding a crosslinking agent represented by the following chemical formula (VIII) to give rise to a crosslinking reaction to produce a crosslinked aromatic polyester resin [component (a-1)] comprising a recurring unit represented by the chemical formula (II), a recurring unit represented by the following chemical formula (III), a recurring unit represented by the following chemical formula (IV) and a crosslinking group represented by the following chemical formula (V), in which component (a-1) the content of the recurring unit represented by the chemical formula (II) is 39.9 to 65 mole %, the content of the recurring unit represented by the chemical formula (III) is 0.1 to 20 mole %, the content of the recurring unit represented by the chemical formula (IV) is 15 to 60 mole %, and the content of the crosslinking group represented by the chemical formula (V) is 0.1 to 20 mole %, all based on the total moles of the polyhydric alcohol-derived atomic groups present in the molecule of the component (a-1), and at least one recurring unit selected from the group consisting of the recurring units represented by the chemical formulas (II), (III) and (IV) is crosslinked by the crosslinking group represented by the chemical formula (V), a second step of depolymerizing an aromatic polyester comprising a recurring unit represented by the chemical formula (II) with a polyhydric alcohol comprising a dihydric alcohol represented by the chemical formula (VI) and thereafter or simultaneously therewith conducting polycondensation reaction in the rpesence of at least one carboxylic acid selected from the group consisting of a monocarboxylic acid and a dicarboxylic acid and at least one alcohol selected from the group consisting of a monohydric alcohol and a dihydric alcohol to produce a linear aromatic polyester resin [component (a-2)] having a recurring unit represented by the chemical formula (II) and a recurring unit represented by the chemical formula (IV), in which component (a-2) the content of the recurring unit represented by the chemical formula (II) is 40 to 80 mole % and the content of the recurring unit represented by the chemical formula (IV) is 15 to 60 mole %, all based on the total moles of the polyhydric alcohol-derived atomic groups present in the molecule of the component (a-2), a third step of melt-kneading the component (a-1) produced in the first step and the component (a-2) produced in the second step, in proportions of 5 to 80% by weight [the component (a-1)] and 20 to 95% by weight [the component (a-2)] based on the total weight of the components (a-1) and (a-2) to produce a binder resin component [component (A)], and a fourth step of melt-kneading the binder resin component [component (A)] produced in the third step and a coloring agent component [component (B)] to produce a toner composition:

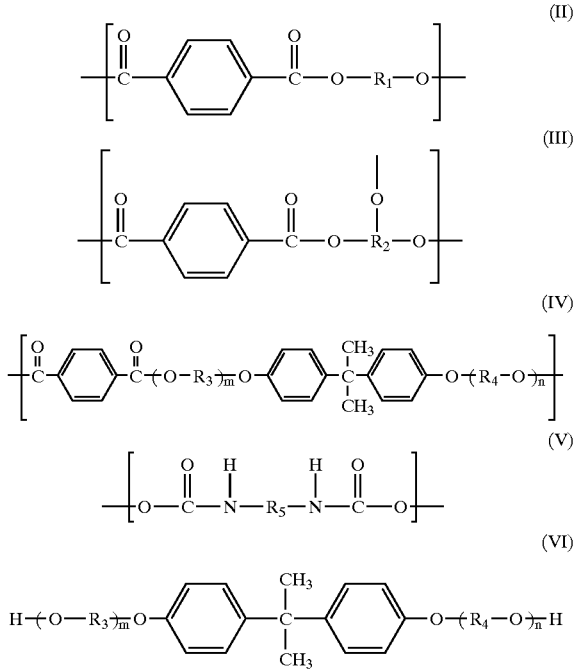

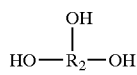

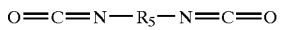

[wherein, in the chemical formula (II), R1 is an atomic group having 2 to 10 carbon atoms; in the chemical formula (III) and the chemical formula (VII), R2 is an atomic group having 3 to 10 carbon atoms; in the chemical formula (IV) and the chemical formula (VI), R3 and R4 may be the same or different, are each independently an atomic group having 2 to 10 carbon atoms; in the chemical formula (IV) and the chemical formula (VI), m and n may be the same or different and are each independently an integer of 1 to 10; and in the chemical formula (V) and the chemical formula (VIII), R5 is an atomic group having 6 to 20 carbon atoms which may be aliphatic or aromatic.

12. A process for producing a toner composition according to claim 11, wherein the chemical formula (II) is the following chemical formula (II'), the chemical formula (III) is the following chemical formula (III') and/or the following chemical formula (III"), the chemical formula (IV) is the following chemical formula (IV') and/or the following chemical formula (IV"), the chemical formula (V) is the following chemical formula (V'), the chemical formula (VI) is the following chemical formula (VI') and/or the following chemical formula (VI"), and the chemical formula (VII) is the following chemical formula (VII'):

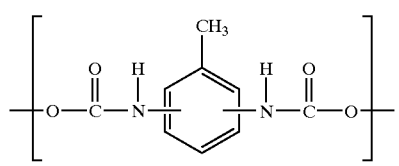
(V')

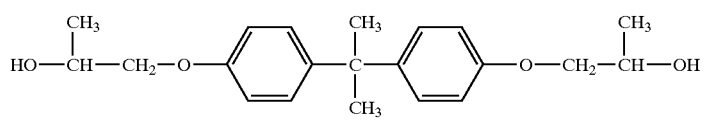
(VI')

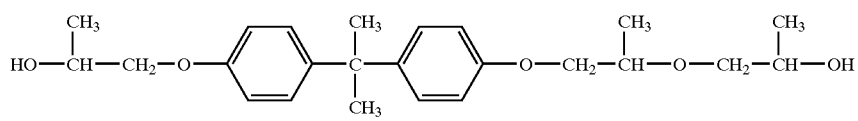
(VI")

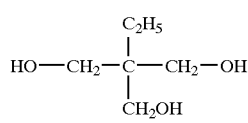
(VII')

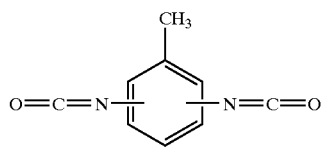
(VIII')

13. A process for producing a toner composition according to claim 11, wherein the aromatic polyester comprising a recurring unit represented by the chemical formula (II) is a recycled PET (polyethylene terephthalate) and/or a recycled PBT (polybutylene terephthalate).

14. A process for producing a toner composition, which comprises:

a first step of depolymerizing an aromatic polyester having a recurring unit represented by the following chemical formula (II) with a polyhydric alcohol comprising a dihydric alcohol represented by the following chemical formula (VI) and trihydric alcohol represented by the following chemical formula (VII), and thereafter or simultaneously therewith conducting polycondensation reaction in the presence of at least one carboxylic acid and at least one alcohol to produce an aromatic polyester resin to be crosslinked [component (a-1')] comprising a recurring unit represented by the chemical formula (II), a recurring unit represented by the following chemical formula (III) and a recurring unit represented by the following chemical formula (IV), in which component (a-1') the content of the recurring unit represented by the chemical formula (II) is 39.9 to 65 mole %, the content of the recurring unit represented by the chemical formula (III) is ).1 to 20 mole %, and the content of the recurring unit represented by the chemical formula (IV) is 15 to 60 mole %, all based on the total moles of the polyhydric alcohol-derived atomic groups present in the molecule of the component (a-1'), a second step of depolymerizing an aromatic polyester comprising a recurring unit represented by the chemical formula (II) with a polyhydric alcohol comprising a dihydric alcohol represented by the chemical formula (VI) and thereafter or simultaneously therewith conducting polycondensation reaction in the presence of at least one carboxylic acid selected from the group consisting of a monocarboxylic acid and a dicarboxylic acid and at least one alcohol selected from the group consisting of a monohydric alcohol and a dihydric alcohol to produce a linear aromatic polyester resin [component (a-)] having a recurring unit represented by the chemical formula (II) and a recurring unit represented by the chemical formula (IV), in which component (a-2) the content of the recurring unit represented by the chemical formula (II) is 40 to 80 mole % and the content of the recurring unit represented by the chemical formula (IV) is 15 to 60 mole %, all based on the total moles of the polyhydric alcohol-derived atomic groups present in the molecule of the component (a-2), a third step of melt-kneading the component (a-1') produced in the first step and the component (a-2) produced in the second step, in proportions of 5 to 80% by weight [the component (a-1')] and 20 to 95% by weight [the component (a-2)] based on the total weight of the components (a-1') and (a-2), and thereafter or simultaneously therewith adding a crosslinking agent agent represented by the following chemical formula (VIII) to give rise to a crosslinking reaction to produce a binder resin component [component (A)] comprising a recurring unit represented by the chemical formula (II), a recurring unit represented by the following chemical formula (III) a recurring unit represented by the following chemical formula (IV) and a crosslinking group represented by the following chemical formula (V), and a fourth step of melt-kneading the binder resin component [component (A)] produced in the third step and a coloring agent component [component (B)] to produce a toner composition:

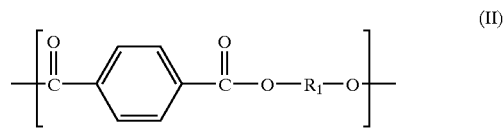
(II)

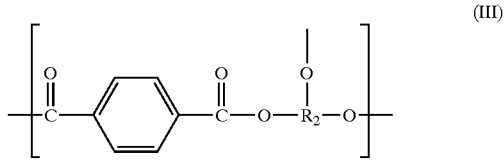
(III)

-continued

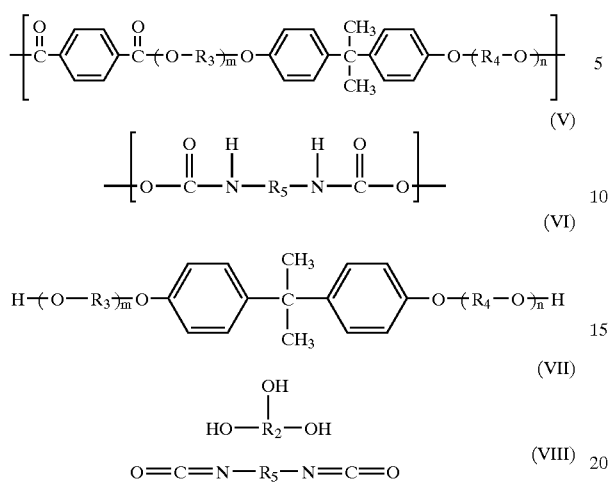

[wherein, in the chemical formula (II), R1 is an atomic group having 2 to 10 carbon atoms; in the chemical formula (III) and the chemical formula (VII), R2 is an atomic group having 3 to 10 carbon atoms; in the chemical formula (IV) and the chemical formula (VI), R3 and R4 may be the same or different, are each independently an atomic group having 2 to 10 carbon atoms; in the chemical formula (IV) and the chemical formula (VI), m and n may be the same or different and are each independently an integer of 1 to 10; and in the chemical formula (V) and the chemical formula (VIII), R5 is an atomic group having 6 to 20 carbon atoms which may be aliphatic or aromatic.

15. A process for producing a toner composition according to claim 14, wherein the chemical formula (II) is the following chemical formula (II'), the chemical formula (III) is the following chemical formula (III') and/or the following chemical formula (III''), the chemical formula (IV) is the following chemical formula (IV') and/or the following chemical formula (IV''), the chemical formula (V) is the following chemical formula (V'), the chemical formula (VI) is the following chemical formula (VI') and/or the following chemical formula (VI''), and the chemical formula (VII) is the following chemical formula (VII'):

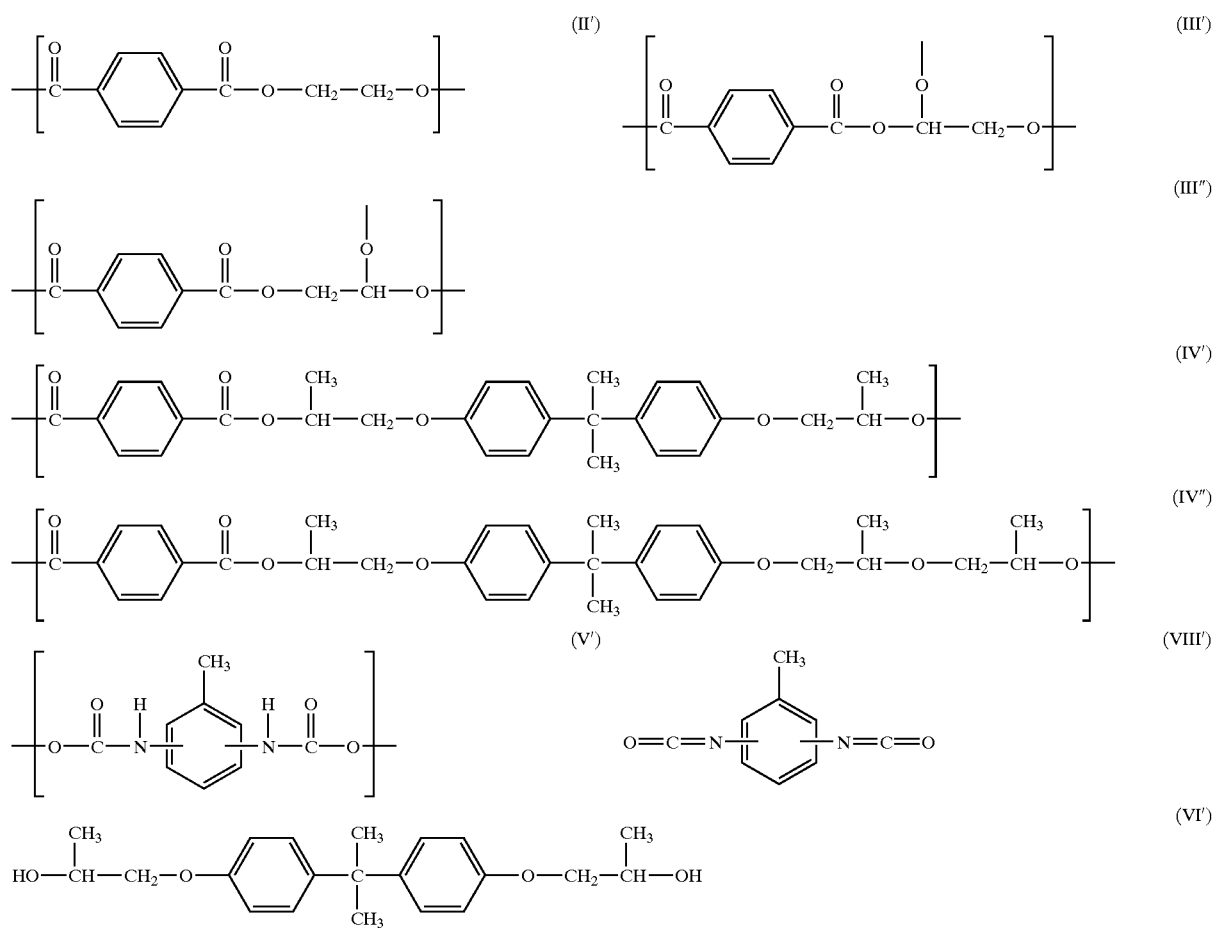

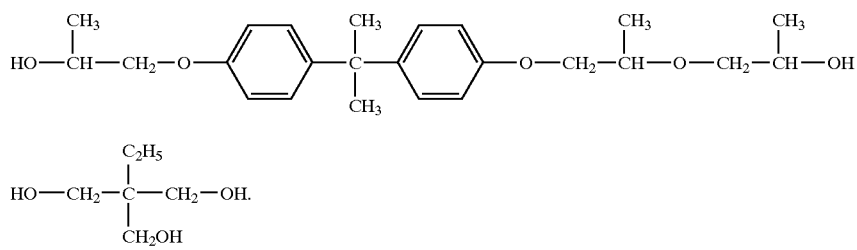

(VI")

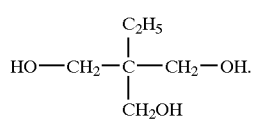

(VII')

16. A process for producing a toner composition according to claim 14, wherein the aromatic polyester comprising a recurring unit represented by the chemical formula (II) is a recycled PET (polyethylene terephthalate) and/or a recycled PBT (polybutylene terephthalate).

17. A toner composition according to claim 2, wherein the binder resin component [component (A)] has such a viscoelasticity that, in the curve obtained by using the axis of abscissas as temperature and the axis of ordinates as logarithm of G' (storage modulas), a shoulder or peak having the maximum of the differential curve in a temperature range of 100 to 180 appears in a temperature range of 80 to 200.

18. A toner composition according to claim 2, wherein the tetrahydrofuran (THF) soluble portion of the binder resin component [component (A)] has a molecular weight distribution (Mw/Mn) of 6 of 100 when measured by gel permeation chromatogrphy (GPC).

19. A toner composition according to claim 2, wherein the tetrahydrofuran (THF) soluble portion of the binder resin component ]component (A)] has a peak molecular weight of 1,000 to 8,000 when measured by gel permeation chromatography (GPC).

20. A toner composition according to claim 2, wherein the tetrahydrofuran (THF) insoluble portion of the binder resin component [component (A)] is 0.1 to 40% by weight in the binder resin component [component (A)].

21. A toner composition according to claim 2, wherein the binder resin component [component (A)] has a glass transition temperature (Tg) of 40 to 70.

22. A toner composition according to claim 2, wherein the binder resin component [component (A)] has a density of 1.22 to 1.27 g/cm$^3$.

23. A toner composition according to claim 2, wherein the binder resin component [component (A)] has an OH value of 0 to 100 KOH mg/g.

* * * * *